United States Patent [19]
Lathrop

[11] Patent Number: 5,701,427
[45] Date of Patent: Dec. 23, 1997

[54] INFORMATION TRANSFER ARRANGEMENT FOR DISTRIBUTED COMPUTER SYSTEM

[75] Inventor: Alan Lathrop, Littleton, Mass.

[73] Assignee: Digital Equipment Corp., Maynard, Mass.

[21] Appl. No.: 408,751

[22] Filed: Sep. 19, 1989

[51] Int. Cl.$^6$ .................................................. G06F 13/38
[52] U.S. Cl. ............................................... 395/200.01
[58] Field of Search ................................ 364/200, 900; 395/200, 650, 700, 200.01

[56] References Cited

U.S. PATENT DOCUMENTS

| | | | |
|---|---|---|---|
| 3,475,723 | 10/1969 | Burton et al. | 346/945.1 |
| 3,879,577 | 4/1975 | Progler | 371/32 |
| 4,554,660 | 11/1985 | Noirel et al. | 370/349 |
| 4,675,864 | 6/1987 | Bliek et al. | 370/449 |
| 4,805,168 | 2/1989 | Kato | 340/825.5 |
| 4,807,224 | 2/1989 | Naron et al. | 370/218 |
| 4,818,984 | 4/1989 | Chang et al. | 340/825.54 |
| 4,941,089 | 7/1990 | Fischer | 364/200 |
| 4,959,833 | 9/1990 | Mercola et al. | 371/32 |
| 5,014,267 | 5/1991 | Thompkins et al. | 370/62 |

*Primary Examiner*—Kevin A. Kriess
*Assistant Examiner*—John Q. Chavis
*Attorney, Agent, or Firm*—Fish & Richardson, P.C.

[57] ABSTRACT

A computer system comprising one or more information source modules and information display modules interconnected by a communications link. The information source module transmits, and the information display module receives, original information items using a peer-to-peer message transmission protocol. Thereafter, the information source module transmits update information items to the information display modules at one time using a multi-cast information transmission mechanism. In the multi-cast information transmission mechanism, an information display module determines when it has missed an update information message, waits a selected backoff delay time, and transmits a retransmission request for update information messages whose retransmission has not been requested by other information display modules during the backoff delay period. The information display modules receive the retransmitted update information messages and process them in the same order in which the corresponding update information messages were originally transmitted. The original update information messages and the retransmitted update information messages are transmitted over different channels and only those information display modules that need to receive the retransmitted messages monitor the retransmission channel.

53 Claims, 15 Drawing Sheets

FIG. 1 SYSTEM 10

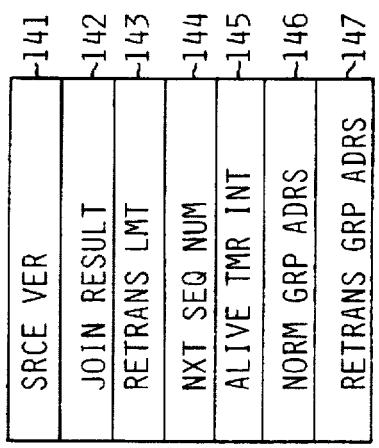
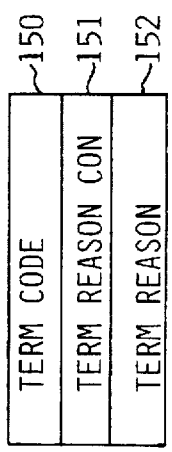
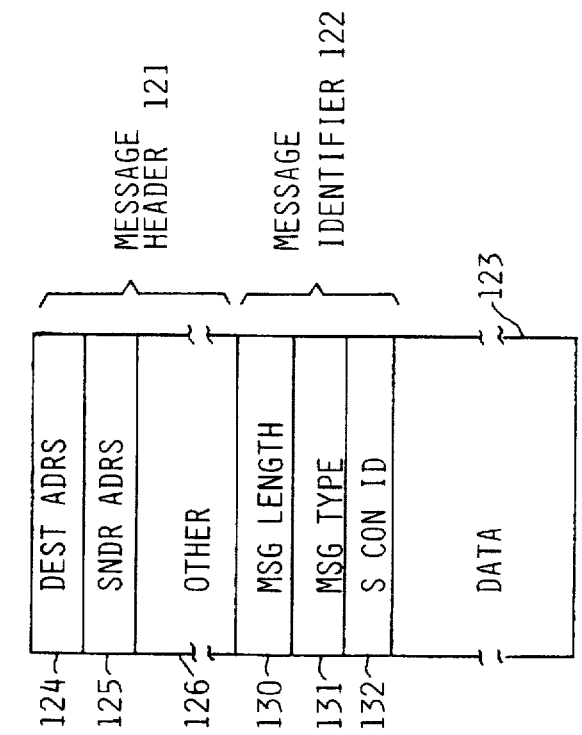

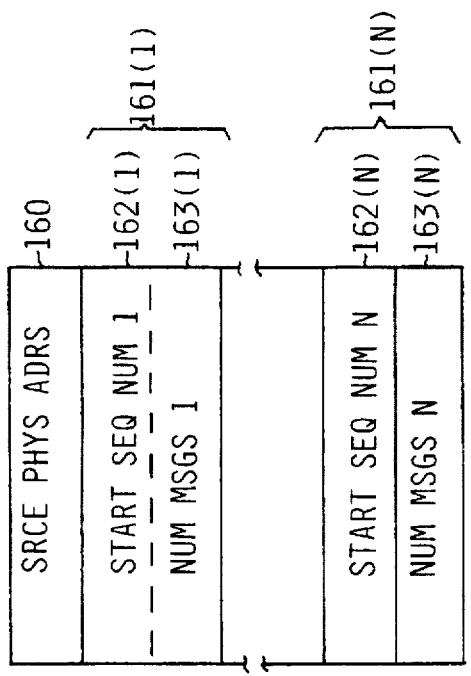
FIG. 5G RETRANSMIT REQUEST
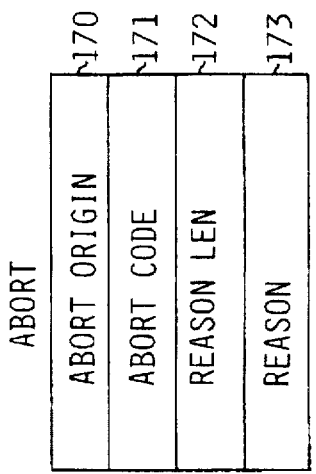
FIG. 5H ABORT
FIG. 5E ALIVE
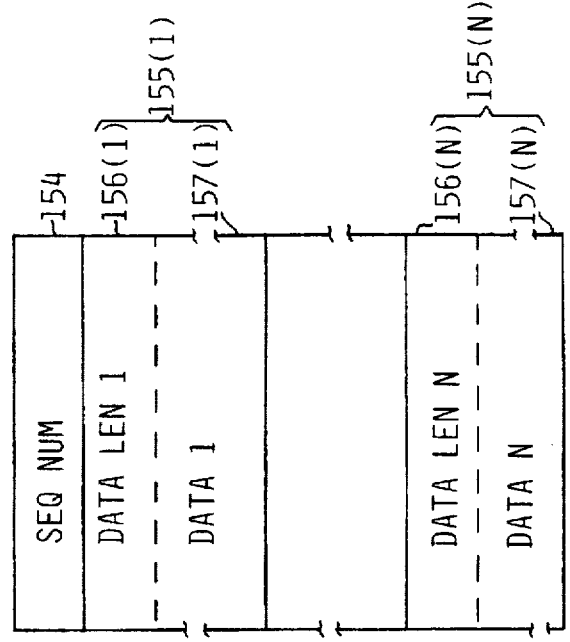
FIG. 5F DATA

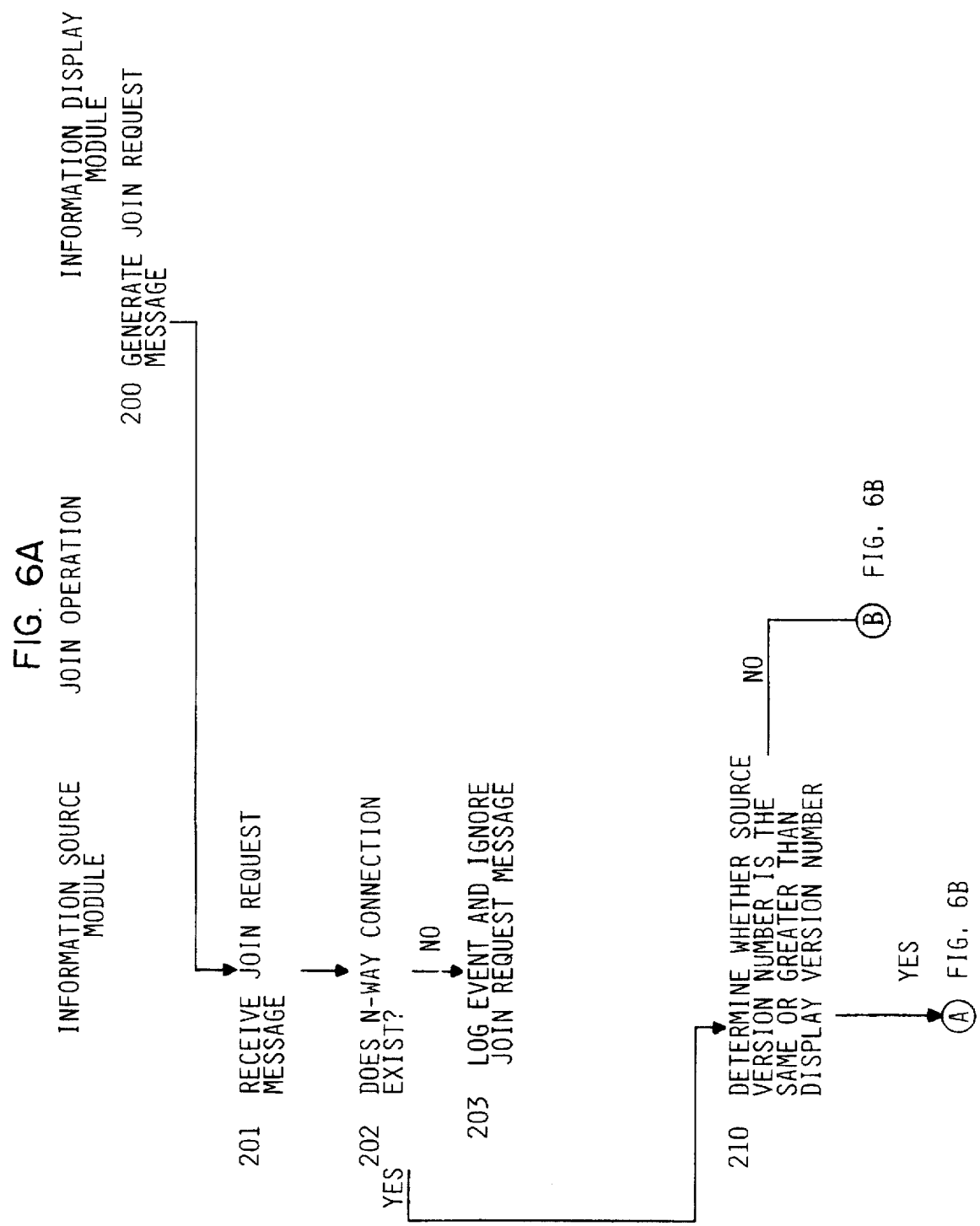

FIG. 7A

UPDATE INFORMATION TRANSMIT OPERATION

INFORMATION SOURCE MODULE

250 RECEIVE UPDATE INFORMATION FROM INFORMATION SOURCE AND STORE IN TRANSMIT DATA BUFFER

251 HAS BLOCK TIMER BEEN STARTED? →NO

252 START BLOCK TIMER

253 HAS BLOCK TIMER TIMED OUT? →YES

254 GENERATE DATA MESSAGE FOR NORMAL GROUP ADDRESS INCLUDING ANY DATA IN TRANSMIT DATA BUFFER AND SEQUENCE NUMBER FROM NEXT SEQUENCE NUMBER FIELD

255 TRANSFER TRANSMITTED DATA AND SEQUENCE NUMBER TO RETRANSMIT QUEUE

256 INCREMENT CONTENTS OF NEXT SEQUENCE NUMBER FIELD

257 RESET ALIVE MESSAGE TIMER

INFORMATION DISPLAY MODULE

260 RECEIVE DATA MESSAGE

261 RESET ALIVE TIME-OUT TIMER AND ALIVE TIME-OUT COUNTER

262 DOES SEQUENCE NUMBER OF DATA MESSAGE CORRESPOND TO CONTENTS OF NEXT SEQUENCE NUMBER FIELD?
→YES D FIG. 7B
→NO E FIG. 9A

INFORMATION DISPLAY MODULE

FIG. 7A (D) → 263 USE UPDATE INFORMATION TO UPDATE CURRENT INFORMATION → 264 INCREMENT CONTENTS OF NEXT SEQUENCE NUMBER FIELD

FIG. 7B

INFORMATION SOURCE MODULE

RETRANSMIT REQUEST OPERATION

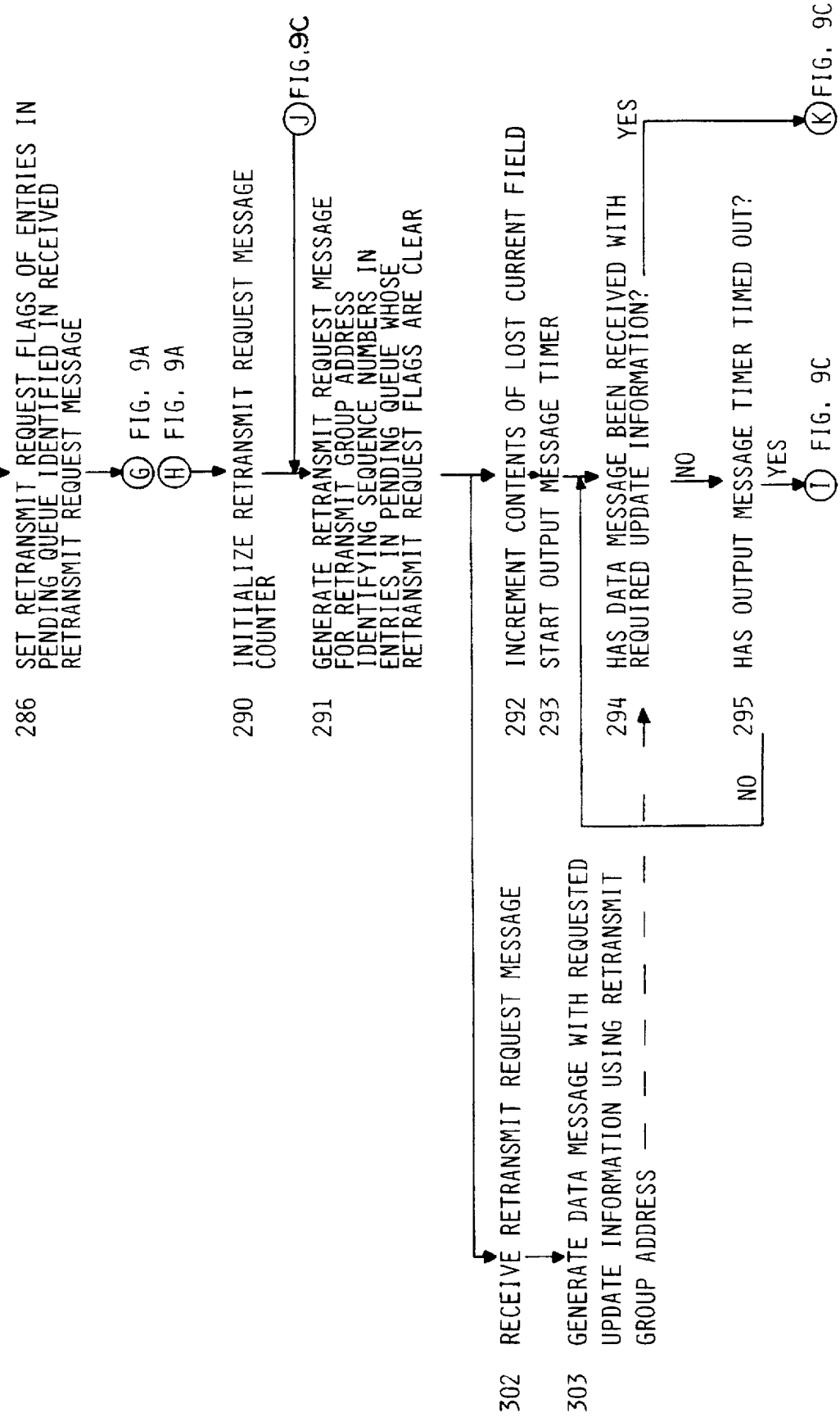

5,701,427

INFORMATION TRANSFER ARRANGEMENT FOR DISTRIBUTED COMPUTER SYSTEM

FIELD OF THE INVENTION

The invention relates generally to the field of digital data processing systems, and more particularly to arrangements for transmitting information from an information source to an information receiver over a network in a distributed system.

BACKGROUND OF THE INVENTION

Until recently, computer systems were large, expensive machines. In many instances, to justify their cost, they were shared among a number of users, or operators, who would use the computer contemporaneously. A benefit of allowing a number of operators to use a computer contemporaneously was that data could be readily and easily shared among them.

Since the prices and sizes of computers have decreased tremendously, it has become practical to allow even individual operators to have their own computers. These computers are generally termed "personal computers" with more powerful personal computers generally termed "workstations." To allow sharing of data, the computers are typically connected to computer networks. The computers share data by transmitting and receiving messages containing the data to be shared.

A number of protocols have been devised by which the computers can transfer data over a network. Many of the protocols are "peer-to-peer," which allow pairs of computers to communicate. Typically, peer-to-peer protocols require a large amount of overhead, and are used to transfer large blocks of data. Some networks also have a broadcast or multi-cast facility, which permits a computer on the network to transmit a single message which is received by a number of other computers contemporaneously.

SUMMARY OF THE INVENTION

In one aspect, the invention provides a computer system with an information source module and an information display module interconnected by a communications link. The information source module includes: an original information transmission module for transmitting an original information item over the communications link for receipt by an information display module in response to an original information item request therefor from that information display module; and an update information transmission module for transmitting update information items containing update information relating to an original information item over the communications link. The information display module includes: an original information receiving module for transmitting an original information item request over the communications link and for receiving an original information item in response thereto; and an update information reception module for receiving update information items from the communications link and updating the original information item received by the original information receiving module in response thereto.

In another aspect, the invention provides, in a computer system with an information source module and an information display module interconnected by a communications link, an arrangement for transferring update information items from the information source module to the information display module in a series of sequenced update messages. The information display module includes an update information reception module that includes: an original update reception module for receiving original update messages, each including an update information item, from the communications link; an update processing module for determining whether the messages received by the original update reception module are in sequence; and a retransmit update request module for transmitting a retransmission request message over the communications link in response to a negative determination by the update processing module. The information source module includes an update information transmission module that includes: an original update transmission module for transmitting original update messages over the communications link; a retransmit update transmission module for transmitting retransmit update messages, each including an update information item, over the communications link; and a retransmit request receiving module for receiving retransmission request messages from the communications link and for enabling the retransmit update transmission module in response thereto.

In yet another aspect, the invention provides an information source module for use in a computer system including an information display module and a communications link for facilitating transfer of messages therebetween that includes: an original information transmission module for transmitting an original information item over the communications link for receipt by the information display module in response to an original information item request therefor from the information display module; and an update information transmission module for transmitting update information items containing update information relating to the original information item over the communications link.

In yet a further aspect, the invention provides an information source module for use in a computer system comprising an information source module and an information display module interconnected by a communications link, the information source module includes an update information transmission module that includes: an original update transmission module for transmitting original update messages over the communications link; a retransmit update transmission module for transmitting retransmit update messages, each including an update information item, over the communications link; and a retransmit request receiving module for receiving retransmission request messages from the communications link and for enabling the retransmit update transmission module in response thereto.

In a further aspect, the invention provides an information display module for use in a computer system including an information source module and a communications link, the information display module comprising: an original information receiving module for transmitting an original information item request over the communications link and for receiving an original information item in response thereto; and an update information reception module for receiving update information items from the communications link and updating the original information item received by the original information receiving module in response thereto.

In yet another aspect, the invention provides an information display module for use in a computer system comprising an information source module and an information display module interconnected by a communications link. The information display module comprises an arrangement for transferring update information that includes: an original update reception module for receiving original update messages, each including an update information item, from the communications link; an update processing module for determining whether the messages received by the original update reception module are in sequence; and a retransmit update request module for transmitting a retransmission request message over the communications link in response to a negative determination by the update processing module.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 5A through 5H depict structures of messages transferred by the information source modules and information display modules depicted in FIG. 1; and FIGS. 6A through 9C are flow diagrams detailing the operations of the information source modules and information display modules.

DETAILED DESCRIPTION OF AN ILLUSTRATIVE EMBODIMENT

Figure 1:
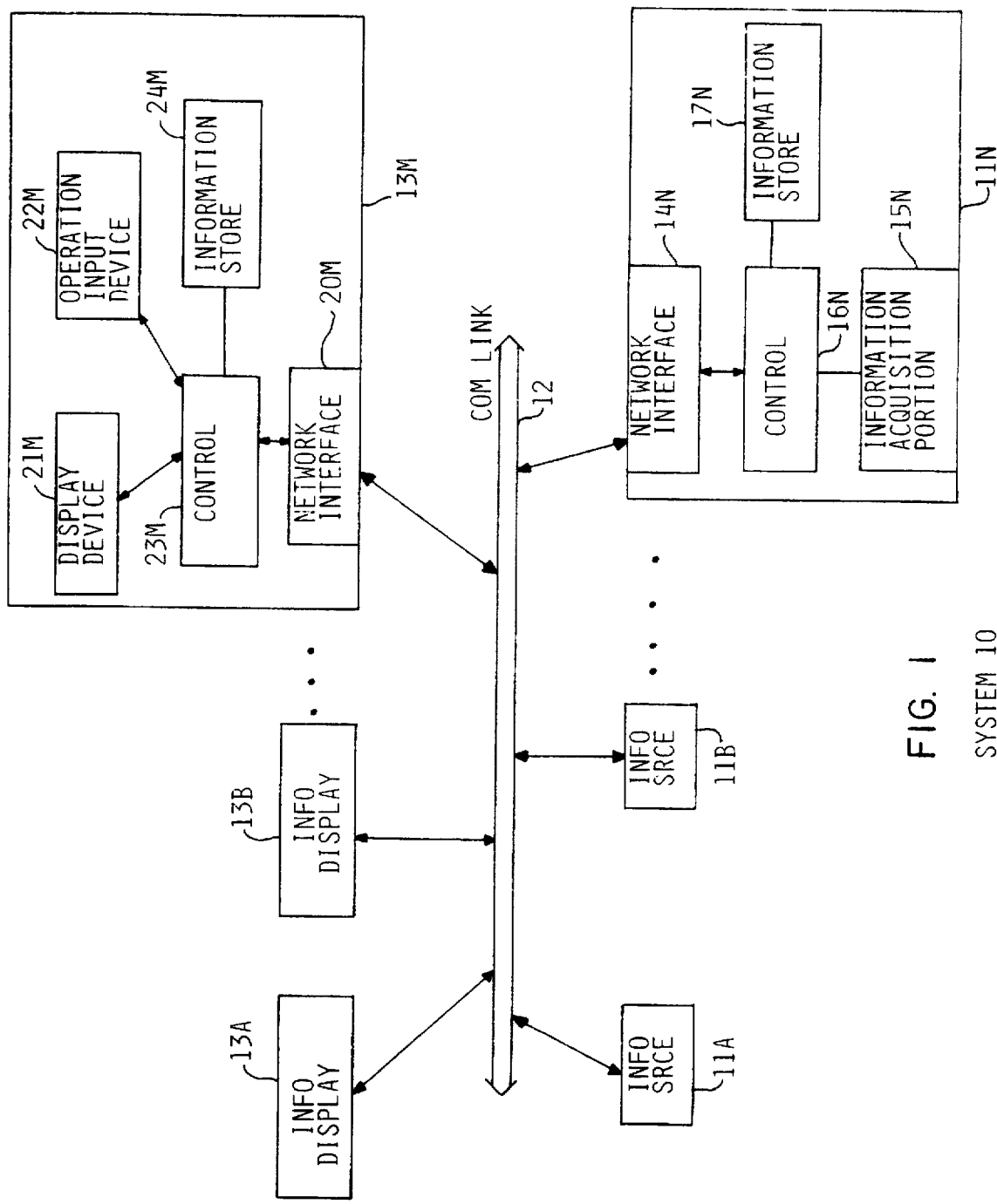
FIG. 1 is a functional block diagram of a distributed computer system constructed in accordance with the invention.

FIG. 1 depicts a functional block diagram of a distributed computer system 10 constructed in accordance with the invention. The system 10 includes one or more information source modules 11A through 11N (generally identified by reference numeral 11) which supply information over a communications link 12 to one or more information display modules 13A through 13M (generally identified by reference numeral 13). The communications link 12 may take the form of any one of a number of communications lines which transfer data between nodes in a distributed computer system in bit serial or parallel form. For example, the communications link 12 may take the form of a coaxial cable which transfers messages using the well-known Ethernet local area network protocol. In that protocol, data is organized into messages having a predetermined format and transmitted in bit serial form between nodes connected thereto. A number of other communications links using diverse protocols exist which could also be used in the system 10 depicted in FIG. 1.

The information source modules 11 may comprise a plurality of types of devices which obtain and supply information to the information display modules 13. The types of information supplied by the information source modules 11 depend on the various types of applications in which the system 10 may be used. In one particular embodiment, which will be described herein as illustrative, the system 10 is used to provide financial information from one or more diverse information suppliers (not shown), which is obtained by the information source modules 11, to one or more operators (not shown) at one or more information display modules 13. When an operator wishes to view information which is supplied by an information source module 11, through his or her respective information display module 13, the operator enables the information display module 13 to transmit a request message including a request for a particular type of information over the communications link 12 to an information source module 11 which can provide the desired type of information. The information source module 11A can thereafter, in one or more messages over communications link 13, transfer current values of the requested information type to the operator's information display module 13. In this operation, the information source module 11 may transmit information which it has stored internally, or it may obtain the information from an information supplier which supplies information of the requested type. In addition, the information source module 11 may subsequently transmit, over the communications link 12, messages containing update values to update the previously-supplied information values, which update messages may be received by the information display module 13 which requested the original information, and also by any other information display module 13 which has requested the same information type from the information source module 11.

The structures of the information source modules 11 may generally be similar, and so only information source module 11N is shown in detail. Information source module 11N includes a network interface module 14N (generally identified by reference numeral 14), an information acquisition portion 15N (generally identified by reference numeral 15) and a control module 16N (generally identified by reference numeral 16). The control module 16N includes a digital data processor or microprocessor controlled by a control program to control communications with the information source display modules 13 as described below. The network interface module 14N receives messages from the communications link 12 for selected destination addresses as provided by the control module 16N and couples them to the control module 16N. In addition, the network interface module 14N receives messages from the control module 16N for transmission over the communications link 12. The information acquisition portion 15N, under control of the control module 16N, obtains information from one or more information suppliers (not shown), external to the system 10. If the system 10 is used to provide financial information to one or more operators, the information suppliers may be one or more of a plurality of well-known sources of financial information, such as Reuters, Dunn & Bradstreet, various stock exchanges or stock brokerage houses, and so forth. The information source module 11N also includes an information store 17N (generally identified by reference numeral 17) in which the control module 16N may store information which it has received from the information source, and in which it also stores information, as described below in connection with FIG. 3, used in controlling the transmission of messages over the communications link 12.

The structures of the information display modules 13 also may be generally similar, and so only information display module 13M is shown in detail. Information display module 13M includes a network interface module 20M (generally identified by reference numeral 20), a display device 21M (generally identified by reference numeral 21), an input device 22M (generally identified by reference numeral 22), a control module 23M (generally identified by reference numeral 23), and an information store 24M (generally identified by reference numeral 24). The control module 23M includes a digital data processor or microprocessor controlled by a communications control program to control communications with the information source modules 11 as described below, as well as an applications program to control display and use of information by the operator. The display device 21M, under control of the control module 23M, in particular the microprocessor under control of the applications program, displays information, including information which is obtained from the information source modules 11 as well as control and status information which may be generated locally by the control module 23M, to the operator. The input device 22M enables the operator to issue requests to the control module 23M to, among other things, initiate generation of information request messages by the control module 23M for transmission, by the network interface module 20M over the communications link 12. In this operation, the microprocessor, under control of the applications program, receives the reqeusts from the input device 22M and issues them to control the communications control program. The network interface module 20M also receives messages from the communications link 12 and couples them to the control module 20M. The information display module 13 also includes an information store 24M in which the control module 23M may store information which it has received from the information source, and in which it also stores information, as described below in connection with FIG. 4, used in controlling the transmission of messages over the communications link 12.

Figure 2:
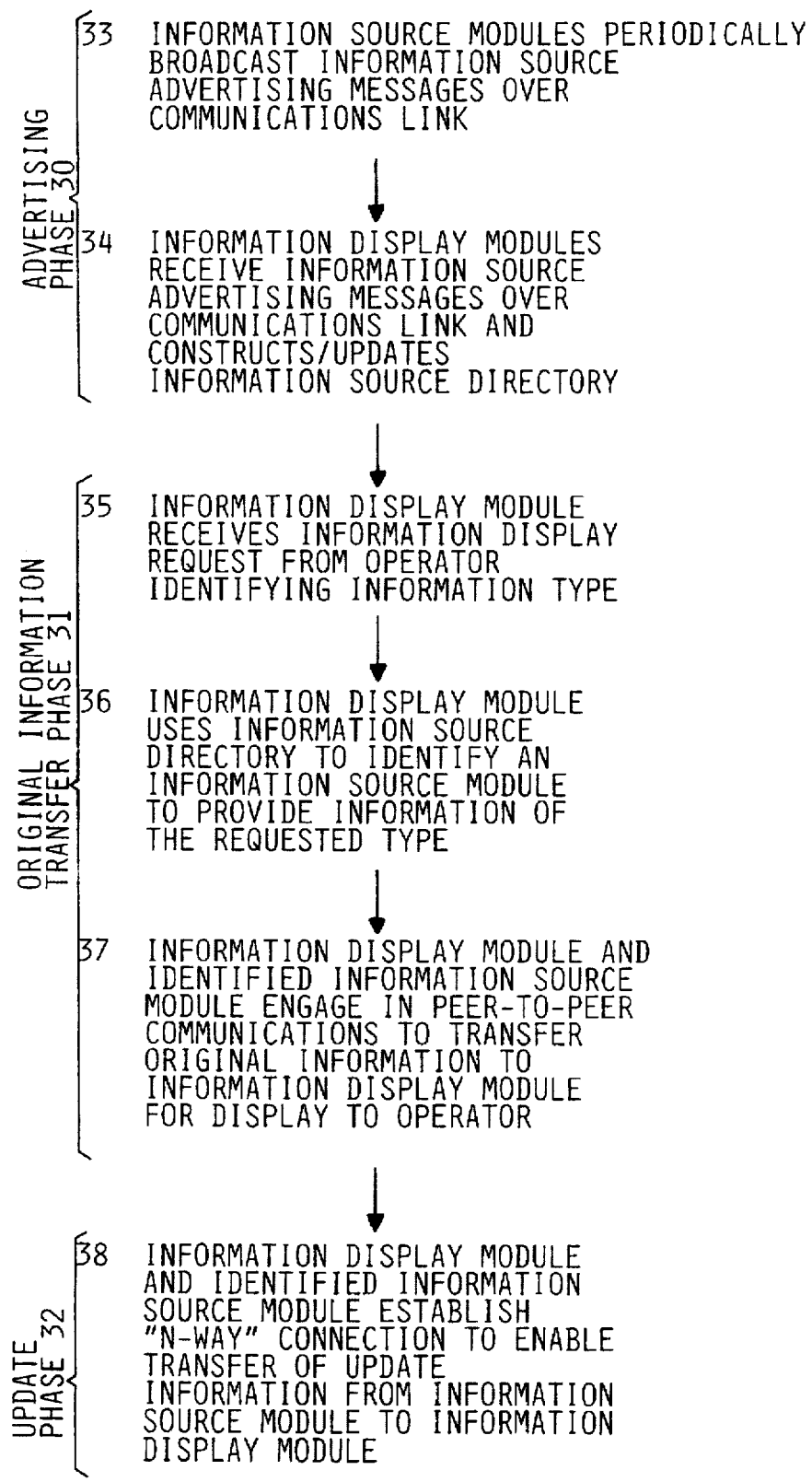
FIG. 2 is a flow diagram depicting the general operation of information source modules and information display modules in transferring information in the system depicted in FIG. 1.

In accordance with one aspect of the invention, the operations of an information display module 13 in connection with the information source modules 11 in obtaining information for display to an operator by the information display module 13 proceed in three general operational phases, which are depicted in FIG. 2. With reference to FIG. 2, the operational phases generally include an advertising phase 30, an original information transfer phase 31, and an update phase 32. During the advertising phase, the information source modules 11 make known to the information display modules 13 the type(s) of information each can provide. In this phase, the information source modules periodically multi-cast, over the communications link 12, information source advertising messages which identify them and the types of information each can provide (step 33). As is conventional, each information source module 11 is identified by an address over the communications link 12, which serves to identify each particular information source module 11 transmitting an information source advertising message.

Each of the information display modules 13 receives the information source advertising messages and uses their contents to establish an information source directory (not shown) which identifies the information source modules 11 and the type(s) of information available from each (step 34). In particular, the network interface 20 of each information display module 13 receives the information source advertising messages and couples them to the control module 23, which processes them to establish the information source directory in the information store 24. If control module 23 has previously established an information source directory, in response to previously-received information source advertising messages from the information source modules 11, the information display module 13 may use the contents of an information source advertising message to update the contents of the existing information source directory. The control module 23 thereafter may use the contents of its information source directory to identify to the operator the types of information which are available through the system 10, and to also identify the particular information source(s) 11 from which the respective type(s) of information may be obtained. The structures and usage of the information source advertising messages and information source directories are generally similar to those of the service advertising message and service directory, respectively, described in U.S. Pat. No. 4,823,122, issued Apr. 18, 1989, to Bruce Mann, entitled Local Area Network For Digital Data Processing System, and assigned to the assignee of this application.

After an information display module 13 has established an information source directory (step 34), the operator may use it to identify particular types of information which can be obtained through system 10, and to have information displayed during the original information transfer phase 31 and update phase 32. During the original information transfer phase, the control module 23 may display, on the display device 21, the types of information identified in the information source directory, and the operator may, using the input device 22, generate an information display request to select an information type from the information source directory (step 35). The information display module 13, in particular its control module 23, uses the contents of the information source directory to identify an information source module 11 to provide the requested information (step 36). In accordance with the system described in the aforementioned Mann patent, the information source advertising messages may also include such information as the loading for particular information source modules 11, and, if the information display module 13 determines that multiple information source modules 11 may provide information of the required type, it may use the loading information in selecting a particular information source module to supply the required information type. The control module 23, under control of its communications control program, enables the exchange, with the identified information source module 11, of one or more messages to transfer the current copy of the information of the requested type from the information source module 11 to the information display module 13. The control module 23, under control of the applications program, also enables the received information to be displayed to the operator by the display device 21 (step 37). In addition, the control module 23 may enable the received information to be stored in the information store 24.

The message exchange performed by the information display module 13 and information source module 11 in step 37 may be according to any of a plurality of "peer-to-peer" message transfer protocols over the communications link 12. In one particular embodiment, the information display module 13 and information source module 11 use a well-known DECnet peer-to-peer protocol, as defined by Digital Equipment Corporation, assignee of this application, to transfer the current copy of the information of the requested type from the selected information source module 11 to the information display module 13.

After the information display module 13 has obtained the current copy of the information of the requested type for display to the operator, the operations sequence to the update phase 32, comprising step 38, in which the information display module 13 and information source module 11 establish a multi-cast information transfer connection, identified below as an "N-Way" connection, which they use to transfer updates and modifications of the requested information type from the information source module 11 to the information display module 13, so that the information display module 13 may display continuously-updated information to the operator.

The operations defining the "N-Way" connection will be described in detail below. Briefly, and in accordance with another aspect of the invention, the N-Way connection permits an information source module 11 to transmit a multi-cast update information message over communications link 12 which includes one or more update information items for a particular type of information, which multi-cast message may be contemporaneously received by all of the information display modules 13 displaying the information type. Thus, all of the information display modules 13 may receive the single multi-cast update information message and use it to update their copy of the information. The information source module 11 transmits the information update message for a particular information type over one channel that is defined by a normal multi-cast address. The information source modules 11 may transmit update information messages for different types of information using different normal multi-cast addresses, and the information display modules 13 may condition their network interface modules 20 to receive the messages only with the normal multi-cast addresses for the types of information which they are monitoring. This may reduce the amount of processing required by the control modules 23 of the respective information display modules 13 in determining whether they should receive and process particular update information messages.

In addition, as a further aspect of the N-way connection, if one or more information display modules 13 fail to receive an information update message, they may transmit retransmission request messages to request retransmission of the update information by the information source module 11, which the module 11 accomplishes over a second, retransmit, channel defined by a second multi-cast address. Since the retransmissions of the update information items are accomplished using the retransmit channel, only those information display modules 11 that require the retransmitted update information items need monitor the retransmit channel. The information source modules 11 may transmit messages containing the retransmitted update information items over a retransmit multi-cast address, and the information display modules 13 may condition their network interface modules 20 to receive the messages with the retransmit multi-cast address only after they have requested a retransmission. This may further reduce the amount of processing required by the control modules 23 of the respective information display modules 13 in determining whether they should receive and process particular retransmitted update information messages.

The detailed operations of the information source modules 11 and information display modules 13 in transferring information using the N-way connection are detailed below in the flow diagrams of FIGS. 6A through 9C. Before describing those operations, data structures maintained by an information source module 11 and an information display module for the N-way connection will be described in connection with FIGS. 3 and 4, respectively. In addition, the structures of various types of N-way connection messages, which the modules 11 and 13 transmit over the communications link 12 will be described in connection with FIGS. 5A through 5H.

Figure 3:
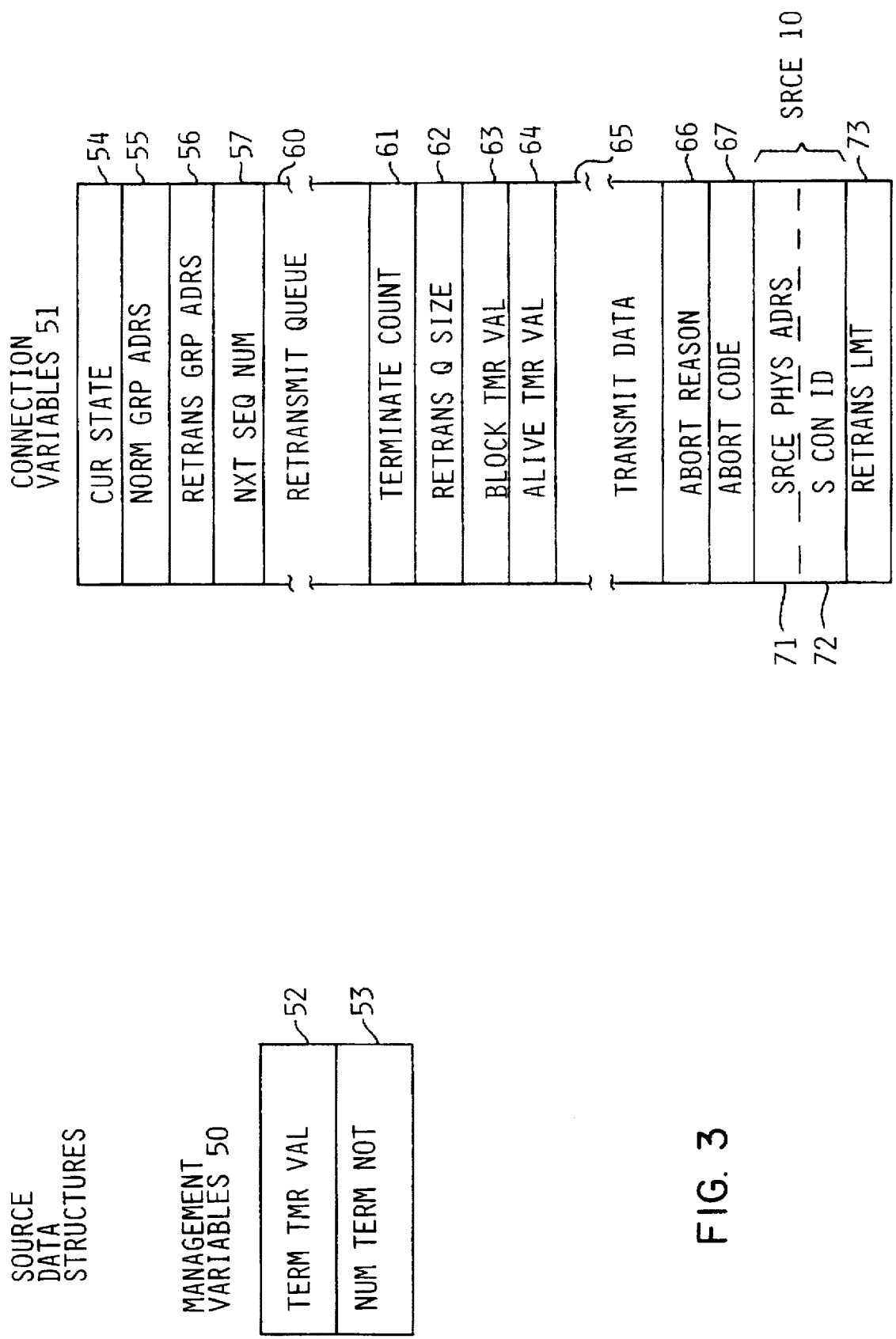
FIGS. 3 and 4 depict data structures maintained by the information source modules and information display modules, respectively, depicted in FIG. 1.

With reference to FIG. 3, an information source module 11 maintaining two sets of data structures, both in its information store 74, including a set of management variables 50 and a set of connection variables 51. The information source module 11 establishes the management variables 50 when it initializes, and it uses them for all N-way connections it may maintain. The connection variables 51 relate to one specific N-way connection, which is defined as described below, and so if a information source module 11 connects to multiple N-way connections, it will have a set of connection variables 51 for each N-way connection. An information source module 11 may use a different N-way connection to transmit update information items for each type of information which it provides.

The management variables 50 maintained by the information source module 11 includes two fields, both relating to termination messages which the information source module 11 transmits over the N-way connection to notify any information display modules 13 using the N-way connection that it is terminating the N-way connection. In particular, a field 52 contains a value that identifies the time between the successive termination messages and a field 53 contains a value that identifies the number of successive termination messages that the information source module 11 will transmit. The particular values selected for fields 52 and 53 controls the reliability level of information display modules 13 in determining that the associated N-way connection has terminated.

The connection variables 51 maintained by the information source module 11 includes a number of fields. A current state field 54 identifies the current state of the information source module 11 in connection with the N-way connection. The information source module 11 may maintain the N-way connection in one of a number of states, identified as idle, initializing initialized, terminating and aborting, which is identified in the current state field 54. A normal group address field 55 contains the multi-cast address used by the information source module 11 to normally transmit messages including update information for the N-way connection, and a retransmit group address field 56 contains the multi-cast address used to transmit messages containing retransmit update information. The multi-cast address maintained in field 55 essentially defines the particular N-way connection. Each update information message over an N-way connection includes a sequence number which is incremented for each successive update information message, and a next sequence number field 57 contains the sequence number to be used for the next update information message.

The connection variables 51 also includes a retransmit queue 60 in which the information source module 11 maintains a plurality of recently-transmitted update information messages, the number being defined by the contents of a retransmit queue size field 62. A retransmit limit field 73 identifies the maximum number of update information messages whose update information items the information source module 11 will retransmit. As described below, the contents of the retransmit limit field 73 are provided to the information display modules 13 when they join the N-way connection, and the information display modules 13 use that value to determine whether the information source module 11 can provide update information from update information messages for which they require retransmission. It will be appreciated the value in the retransmit limit field 73 will be no greater than the value in the retransmit queue size field 62 to ensure that the retransmit queue 60 contains at least the number of update information messages queued as indicated in the retransmit limit field 73.

In one embodiment, an information source module 11 does not transmit each item of update information as it is received from an information source. Instead, to reduce message traffic over the communications link 12, it aggregates update information items over a predetermined amount of time, and then transmits a number of update information items in a single update information message. The connection variables 51 includes a transmit data buffer 65 in which it stores the individual update information items, and a block timer value field 63 that identifies the maximum delay between the time that an update information item is placed in the transmit data buffer and the time that it will be transmitted in an update information message.

In addition, if an information source module 11 has not transmitted an update information message for a predetermined amount of time, it transmits a message, identified below as an "alive" message, over the N-way connection to notify the information display modules 13 connected thereto that the connection is active. An alive timer value field 64 identifies the maximum delay since the last message at which the information source module 11 will transmit an alive message. The contents of the alive timer value field 64 are also provided to information display modules 13 when they join the N-way connection.

The connection variables 51 also include two fields which jointly define a source identification 70, which identify the particular N-way connection for the information source module 11. The source identification 70 includes a source physical address field 71 and a source connection identification field 72. The source physical address field 71 contains the physical address, on communications link 12, of the information source module 11, and the source connection identification field 72 contains a value that uniquely identifies the N-way connection for the information source module 11. The various information source modules 11 may use the same or overlapping values to identify the N-way connections they may use, but the information source modules 11 all have unique source physical addresses on communications link 12, and so the combination of the source physical address, in field 71, and source connection identification, in field 72, uniquely identifies each N-way connection among all N-way connections maintained in system 10.

The connection variables 51 also include several fields used for controlling terminating and aborting of an N-way connection. As noted above, in connection with the management variables 50, an information source module 11 multi-casts multiple termination messages to notify information display modules 13 that it is terminating an N-way connection, and a termination count field 61 identifies the number of termination messages that it has transmitted. When an information source module 11 is aborting an N-way connection, two fields, namely, an abort reason field 66 and an abort code field 67 contain, respectively, a reason value and a code identifying the reason for the abort. As described below, the information source module 11 transmits the contents of these fields 66 and 67 in abort messages that it transmits over the N-way connection.

Figure 4:
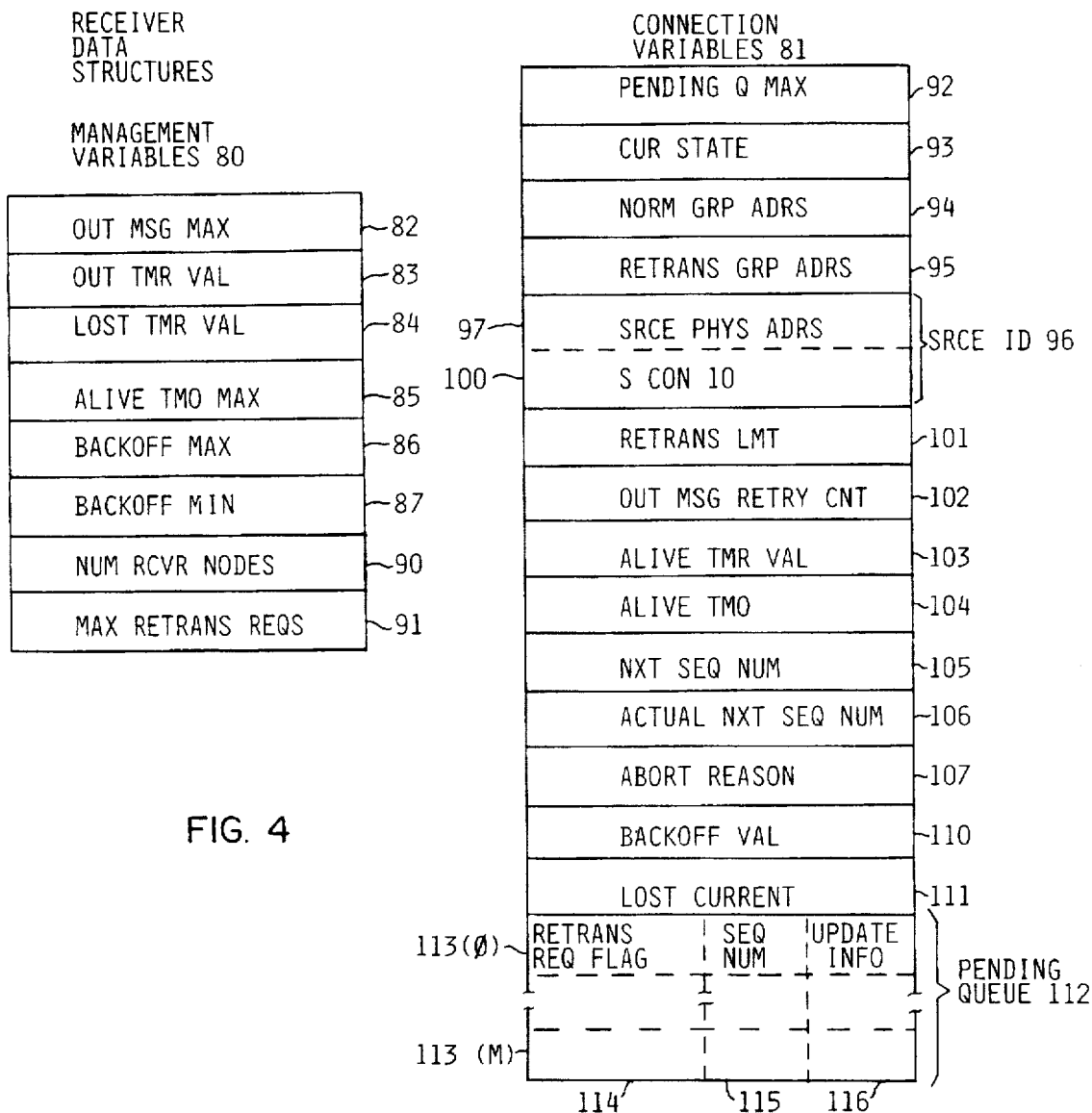

The information display modules 13 also maintain, in their respective information stores 24, data structures, which are depicted in FIG. 4. With reference to FIG. 4, the data structures include a set of management variables 80, which may be used for all N-way connections to which the information display module 13 may connect, and a set of connection variables 81, which relate to one specific N-way connection. If an information display module 13 connects to multiple N-way connections, it will maintain a set of connection variables 81 for each N-way connection.

The management variables 80 maintained by an information display module 13 define several maximum or minimum values for operation of the information display module 13 over the N-way connections to which it is connected. An information display module 13, if it does not receive acknowledgement that a information source module 11 has received a message over an N-way connection, retransmits the message a predetermined maximum number of times. An output message maximum field 82 identifies the number of times the information display module 13 will retransmit a message over the N-way connection and an output timer value field 83 identifies the delay between retransmissions. The values selected for fields 82 and 83, in turn, control reliability of transmission of messages sent by the information display module 13 for receipt by the information source module 11.

In addition, an information display module 13 maintains information as to the number of retransmission request messages which it transmits to an information source module 11 to request retransmissions of update information. If the number, over a selected period of time, exceeds a predetermined value, the information display module 13 determines that it is unable to keep up with the rate of update information messages transmitted by the information source module 11, and, rather than "nag" the information source module 11 with excessive numbers of retransmission request messages, will stop using the N-way connection. To accommodate this, the management variables 80 includes a lost timer field 84 which identifies the time period over which retransmission request messages will be timed, and a maximum retransmission request field 91 which identifies the number of retransmission request messages which will may be transmitted during the time period before the information display module 13 will deem itself to be "nagging."

The management variables 80 also includes an alive timeout maximum field 85 which containing a value identifying the number of sequential alive messages which the information display module 13 may miss before it will determine that the information source module 11 is malfunctioning.

Finally, the management variables includes three fields that contain values used in determining back-off values. The information display module 13 uses the back-off values in determining how long it will delay, after it discovers that it has missed an update information message, before it will transmit a retransmission request message to the information source module 11 over the communications link 12. In particular, in one embodiment, it is likely that, if one information display module 13 has not received an information update message transmitted by an information source module 11 over the N-way connection, other information display modules 13 have also not received the same message. Since the information source module 11 uses the N-way connection's retransmit group address for the retransmission, all of the information display modules 13 which missed the information update message may obtain the update information in the one retransmission, which will be initiated by the information source module 11 when it receives a single retransmission request message. So that the information source module 11 is not deluged by a number of retransmission request messages all relating to the same missed update information message, the information display modules 13, upon determining that they have missed an update information message, determine diverse delay periods. Thereafter, each information display module 13, will also determine whether another information display module 13 has transmitted a retransmission request message requesting transmission of the update information which it missed, and, if not, upon the timing out of its respective delay period, will transmit a retransmission request message. Thus, only if a information display module 13 determines that another information display module 13 has not transmitted a retransmission request message for the same update information before its delay period has expired, will it transmit a retransmission request message.

To accommodate this, the management variables 80 include a back-off maximum field 86, a back-off minimum field 87 and a number of receiver nodes field 90. The back-off maximum and minimum fields 86 and 87 contain maximum and minimum delay periods, and the number of receiver nodes field 90 contains the approximate number of information display modules 13 in the system 10. In one particular embodiment, each information display module 13, when it is initialized, uses the information in these fields 86, 87 and 90 to generate a table (not shown) of delay periods between the minimum and maximum backoff periods defined by fields 86 and 87, in which the number of entries for each delay period follows an exponential distribution. In that case, when the information display module 13 determines that it has missed an update information message, it computes a random number, which it uses to index the table and select a delay period. Since the likelihood of selecting any particular delay period increases exponentially for the longer delay periods, if a number of information display modules 13 miss an update information message, only one, or at most a few, will likely select a short delay period, and, after they have transmitted their retransmission request messages, the others will not. On the other hand, if few information display modules 13 miss an update information message, they are more likely to select a longer delay period, but, since the delay periods follow an exponential distribution, the delay is less than if the distribution followed, for example, a straight line.

As noted above, a information display module 13 also includes a set of connection variables 81 for each N-way connection over which it receives update information messages. The connection variables 81 includes a current state field 93. The information display module 13 may operate over the N-way connection in one of a number of states, identified as idle, join pending, joined, terminating, aborting, and withdrawing, which is identified in the current state field 93. A normal group address field 94 contains the multi-cast address used by the information source module 11 to normally transmit messages including update information, for the N-way connection, and a retransmit group address field 95 contains the multi-cast address used to transmit messages containing retransmit update information. The contents of fields 94 and 95 are provided by the information source module 11 during a join operation as described below. The connection variables 81 also include two fields which jointly define a source identification 96, which identify the particular N-way connection for the information display module 13. The source identification 96 includes a source physical address field 97 and a source connection identification field 100. The contents of fields 97 and 100 are also provided by the information source module 11 during a join operation.

As noted above, each update information message over an N-way connection includes a sequence number which is incremented for each successive update information message, and a next sequence number field 105 contains the sequence number expected for the next update information message. If the actual sequence number of a received message does not correspond to the expected sequence number contained in the next sequence number field 105, the actual sequence number is stored in an actual next sequence number field 106. Thus, the difference between the actual sequence number in field 106 and the contents of the next sequence number field 105 correspond to the number of sequential update information messages missed by the information display module 13.

The connection variables 81 in an information display module 13 further include several additional fields. A retransmission limit field 101 identifies the maximum number of update information items, preceding those in the most recent update information message, which the information source module 11 can provide. The value in field 101 corresponds to the value in retransmit limit field 73 (FIG. 4) and is supplied to the information display module 13 during a join operation.

An output message retry count field 102 maintains a count of the number of times the information display module 13 has transmitted selected messages, including those requesting retransmission of update information items, over the N-way connection. The information display module 13 will continue retransmitting the message until it receives a response, which may include a retransmitted update information item, from the information source module 11 or until the value in field 102 exceeds the value in output message maximum field 82.

An alive timer value field 103 contains a value that identifies the maximum time which may elapse between messages received over the N-way connection from the information source module 11. If the information display module 13 determines that the time between messages is exceeded, it increments the contents of an alive time out field 104. If the contents of the alive time out field 104 exceed the contents of the alive time out maximum field 85, the information display module 13 may determine that the information source module 11 has malfunctioned.

The connection variables 81 also include an abort reason field 107 that, if the information display module 13 is aborting the N-way connection, contains the reason, supplied by the operator, for the abort.

A backoff value field 110 contains a backoff value, which the information display module 13 selects, as described above, if it determines that it has missed an update information message from the information source module 11 over the N-way connection. The information display module 13 waits for a time period identified by the backoff value field 110 before transmitting a retransmission request message. A lost current field 111 maintains a count of retransmission request messages that the information display module 13 has transmitted, which the information display module 13 uses to determine whether it is "nagging," as described above.

Finally, the connection variables maintain two fields relating to update information messages which it has missed, including a pending queue 112 and a pending queue maximum size field 92. The pending queue 112 is established when the information display module 13 determines that it has missed an update information message. The queue 112 includes one or more entries 113(0) through 113(M) (generally identified by reference numeral 113), up to a maximum number identified by the pending queue maximum size field 92. Each entry 113 includes a field 115 that identifies, by sequence number, an update information message which the information display module 13 has missed, and a field 116 in which the information display module 13 stores the update information items therefor when they are received in response to a retransmission request as described below. Each entry 113 also includes a retransmission requested flag 114 whose condition indicates whether the information display module 13 has determined that a retransmission request message requesting retransmission of the update information message has been transmitted, whether by the information display module 13 including the connection variables 81 or by another information display module 13 in the system 10 (FIG. 1). If so, the information display module 13 which maintains connection variables 81 sets the retransmission requested flag. When the information display module's backoff delay period has elapsed, it transmits a retransmission request message only for the update information messages identified by sequence numbers in entries 113 whose retransmission requested flags 114 are not set. This ensures that the information display module 13 sends a retransmission request message only for those messages containing update information for which retransmission has not already been requested by other information display modules 13 in the system. If the information display module 13 does not receive a retransmitted update information message over the multi-cast channel defined by retransmission group address in response to the retransmission request message(s) within a time period defined by the output timer value field 83 in the management variables 80, it thereafter transmits a retransmission request message requesting retransmission of the update information messages identified by all of entries 113 in the pending queue 112.

Each entry 113 in the pending queue 112 also includes a field 116 in which the information display module 13 stores the update information items corresponding to the sequence number identified in field 115, when it is received in a retransmission.

FIGS. 5A depicts the general structure of a message transmitted over an N-way connection. With reference to FIG. 5A, a message 120 generally includes a header portion 121, an identifier portion 122 and a data portion 123. The particular information contained in the header portion 121 depends on the particular type of communications link 12 used in the system 10. In a system 10 in which the communications link 12 comprises an Ethernet, the header contains destination and sender address fields 124 and 125, respectively, and other fields, collectively identified by reference numeral 125, which contain other information, such as the message length and so forth. The destination address field 124 contains the address of the particular node, that is, the information display module 13 or information source module 11, to receive the message, a broadcast address or a multi-cast address. The sender address field 125 contains the address of the particular node that transmitted the message.

The message identifier field 122 includes three fields. A message length field 130 identifies the length, including and following field 130, of the message 120. A message type field 13 1 identifies the type of the message 120, effectively defining the structure of the data portion 123. The structures of data portion 123 for various message types are described below in connection with FIGS. 5B through 5H. A source connection identifier field 132 contains a source connection identifier for the information source module 11 which supports the N-way connection. The contents of the source connection identifier field 132 correspond to the contents of both fields 72 and 100 in the information source module 11 and the information display module 13, respectively.

The structures of the data portion 123 differ as among the various types of messages 120, as depicted in FIGS. 5B through 5H. FIG. 5B depicts the structure of the data portion 123 of a join message, which a information display module 13 transmits to a information source module 11 when it wishes to join an N-way connection supported by the information source module 11. The data portion 123 of a join request message includes a single field 140, which contains a value identifying the version number of the program controlling the information display module 13. The information source module 11 which receives the join request message may use that information to determine whether it can communicate with the information display module 13.

In response to a join request message, information source module 11 transmits a join response message, which containing a data portion 13 including a plurality of fields 141 through 147 depicted in FIG. 5C. With reference to FIG. 5C, field 141 includes a value identifying the version number of the program controlling the information source module 11. If the version number of the program controlling the information display module 13 is less than that of the program controlling the information source module 11, the information display module 13 determines whether it can communicate with the information source module 11 and generates a join response message for transmission to the information display module.

If the version of the program controlling the information display module 13 is less than that of the program controlling the information source module, the information source module 11 determines whether it is compatible with the information display module 13. If not, it sends a join response message with a version number field 141 containing a value that identifies its version. Field 142 of the join response message contains a connection result value indicating the results of processing of the join request by the information source module 11. If the information source module 11 determines that its controlling program is compatible with the program controlling the information display module 13, it provides a positive connection result value in field 142. On the other hand, if it determines that the communications control program controlling the information source module 11 is incompatible with the program controlling the information display module 13, it provides a negative connection result value in field 142.

If the information source module 11 determines that its controlling program and the program controlling the information display module 13 are compatible, it provides the contents of the other fields 143 through 147 from various fields in its connection variables 51. A retransmit limit field 143, which is derived from field 73, contains a value that identifies the maximum number of recently-transmitted update information messages which it can provide in response to retransmission request messages. A next sequence number field 144, derived from field 57, contains the sequence number of the next update information field to be transmitted. An alive timer interval field 145, derived from field 64, identifies the maximum delay since the last message at which the information source module 11 will transmit an alive message. A normal group address field 146, derived from field 55, contains the multi-cast address used by the information source module 11 to normally transmit messages including update information for the N-way connection, and a retransmit group address field 147, derived from field 56, contains the multi-cast address used to transmit messages containing retransmit update information. The information display module 13 which receives the join response message uses the contents of these fields to generate contents of fields 101, 105 and 106, 103, 94 and 95, respectively, in its connection variables 81.

As described above, an information source module 11 may transmit a message 120 having a terminate type if it intends to terminate the N-way connection. A message of the terminate type includes a data portion 123 having three fields, including a code field 150, a length field 151 and a reason field 152. The code field 150 contains, in code form, a terminate reason, and the reason field contains an explanation, in text form, for the termination. The length field 151 contain a value identifying the length of the reason field 152. The information display module 13, upon receiving the termination message, may display the text from reason field 152 to the operator.

A message of the alive type, whose data portion 123 is depicted in FIG. 5E. With reference to FIG. 5E, the data portion 123 of an alive type message includes a single field 153. The field 153 contains the sequence number of the next message containing update information which the information source module 11 will transmit. The information source module 11 obtains the value for field 153 from the next sequence number field 57 in its connection variables 51. The information display modules 13 may use the contents of the field 153 to determine if they have received all preceding update information messages over the N-way connection. In this operation, the information display modules may compare the contents of the field 153 with the contents of the respective next sequence number fields 105 of the connection variables 81 for the N-way connection.

A message of the data transfer type, which the information source module 11 uses to transmit or retransmit update information items, includes a data portion 123 which is depicted in FIG. 5F. With reference to FIG. 5F, the data portion includes a plurality of fields, including a sequence number field and one or more update information fields 155(1) through 155(N) (generally identified by reference numeral 155). The information source module 11 inserts the current value of the next sequence number field 57 from its connection variables 51 in data transfer messages including update information, and increments the contents of the field 57. In data transfer messages including retransmit update information, the information source module 11 includes the sequence number of the original message in which the information was transmitted.

Each update information field 155 includes two fields, including a length field, generally identified by reference numeral 156, and a data field, generally identified by reference numeral 157. Each data field 157 includes an update information item, and the length field 156 contains a value that identifies the length of the update information item.

As noted above, when an information display module 13 requires a retransmission of an update information, it may transmit a retransmission request message to the information source module 11. The data portion 123 of a message of the retransmission request type is depicted in FIG. 5G. With reference to FIG. 5G, the data portion includes a plurality of fields, including a source physical address field 160 and one or more sequence number fields 161(1) through 161(N) (generally identified by reference numeral 161). The source physical address field 160 contains the source physical address of the information source module 11 to which the retransmission request message is being transmitted, which the information display module 13 obtains from field 97 of its connection variables 81. In one embodiment, since retransmission message transfers, including retransmission request messages and retransmission data messages, are expected to be few, the same retransmit group address may be used for multiple N-way connections, including N-way connections involving multiple information source modules 11. Thus, the destination address 124 in such a message may enable multiple information source modules 11 to receive the message, and the source connection identification in field 132 of the message also may not uniquely identify the information source module 11 and N-way connection over which the original update information message was transmitted. The source physical address in field 160 may be used to uniquely identify the information source module 11 to retransmit the update information.

Each sequence number field 161 identifies one or more sequences of update information messages to be retransmitted. Each field 161 includes a start field 162 and a run length field 163. The start field 162 contains the sequence number of the first update information message to be retransmitted, and the run length field 163 identifies the number of sequential update information messages, including and after the update information message identified by start field 162, to be retransmitted.

Finally, an information source module 11 or an information display module 13 may transmit an abort message to abort an N-way connection. A message of the abort type, whose data portion 123 is depicted in FIG. 5H, includes several fields. The abort may be initiated, for example, by the operator, by the information source from which information source module 11 receives information, by the information source module 11 itself, and so forth, and an abort origin field 170 identifies the origin of the abort requirement. An abort code field 171 contains a code identifying the reason for the abort, and a length field 172 contains a value identifying the length of a succeeding reason field 173 which contains a text string identifying the reason for the abort.

Figure 6B:
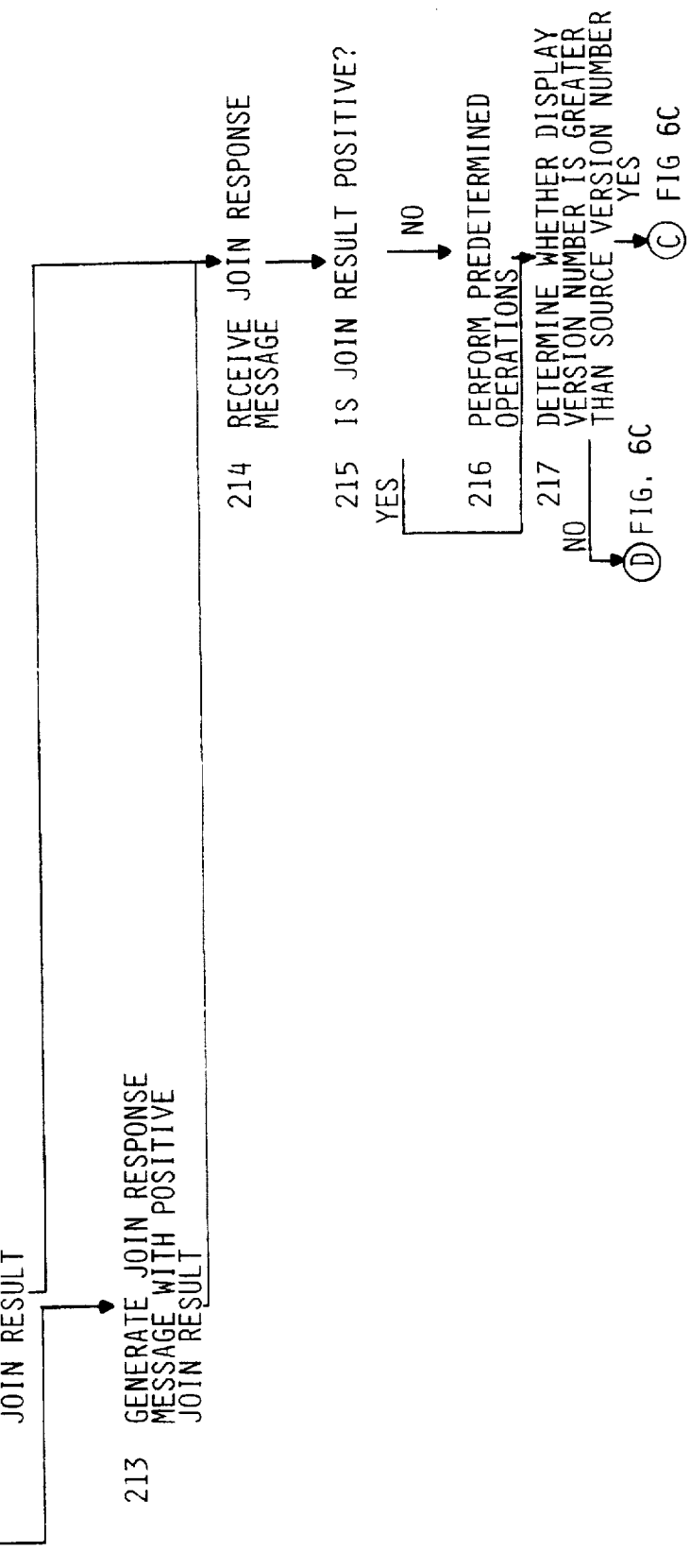
Figure 6C:
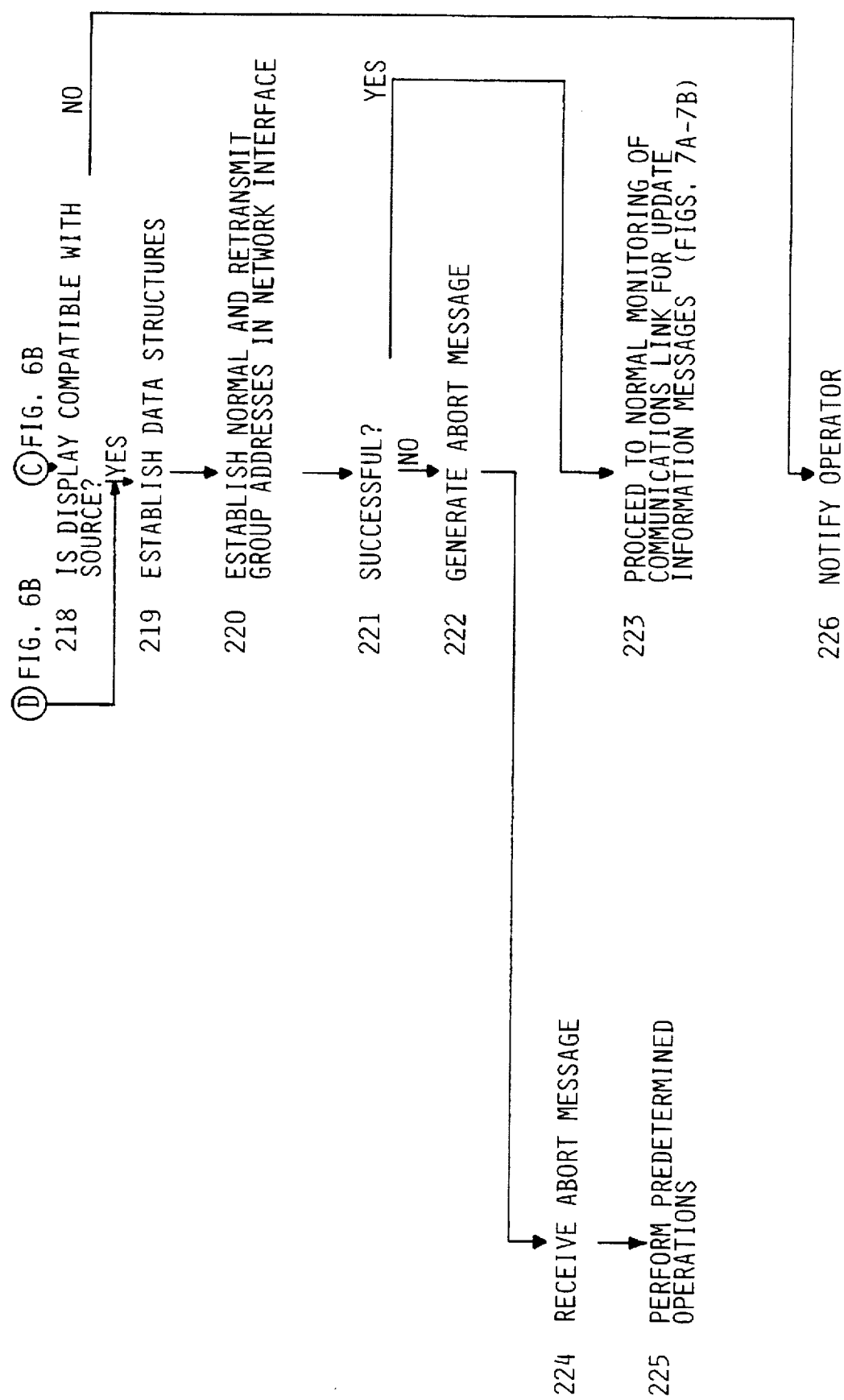
Figure 8:
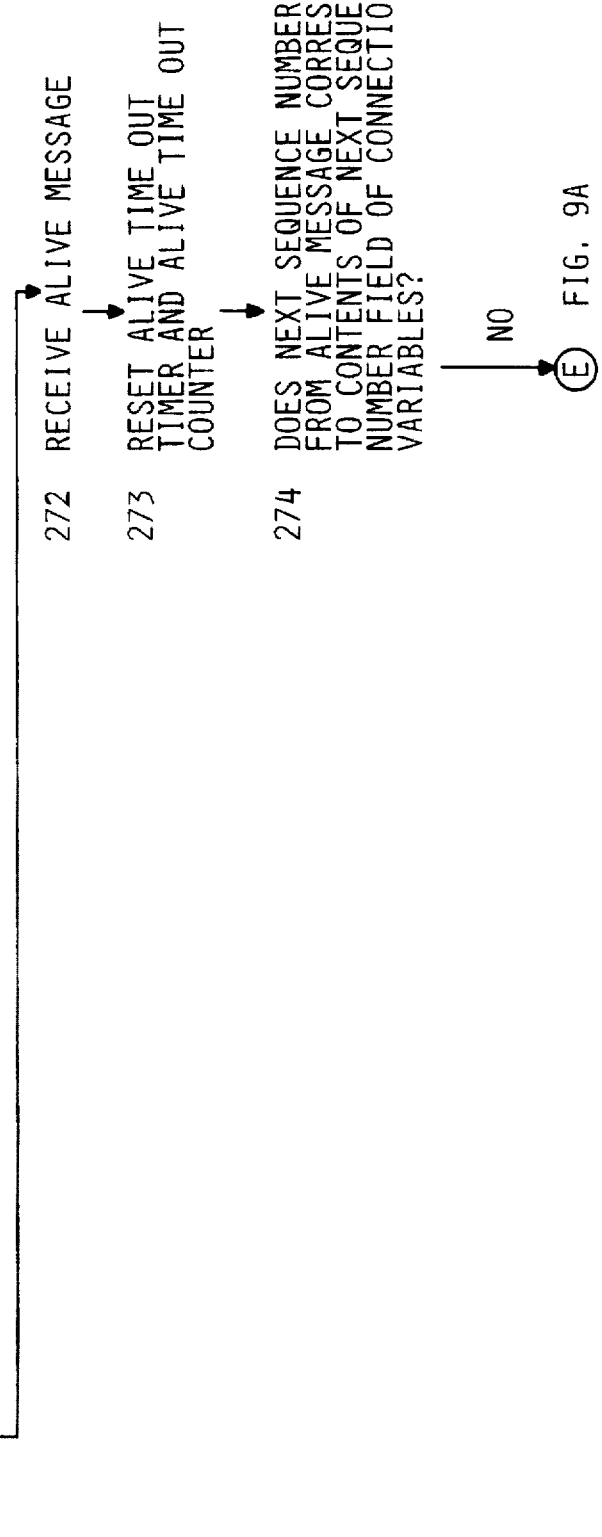
Figure 9A:
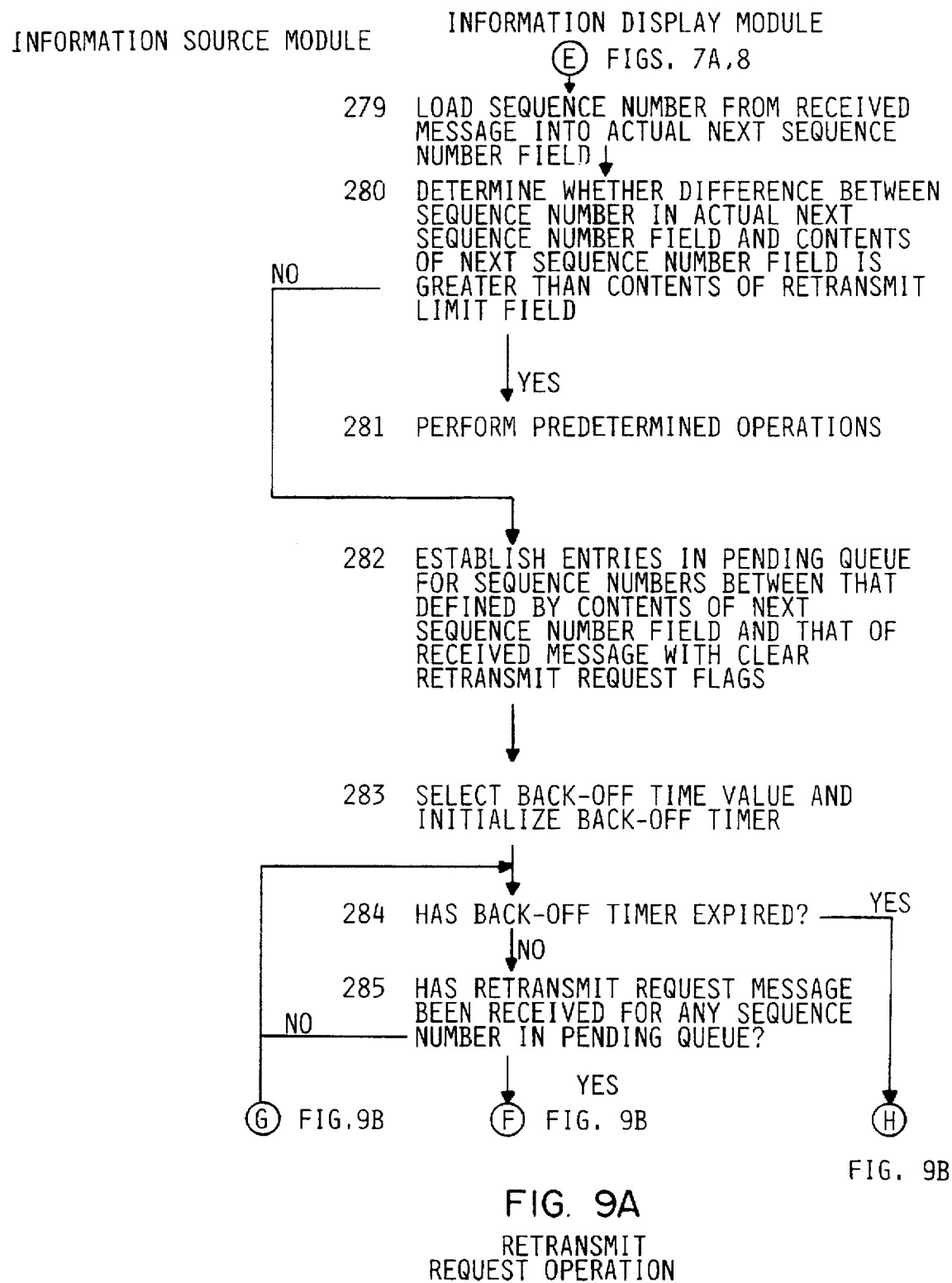
Figure 9C:
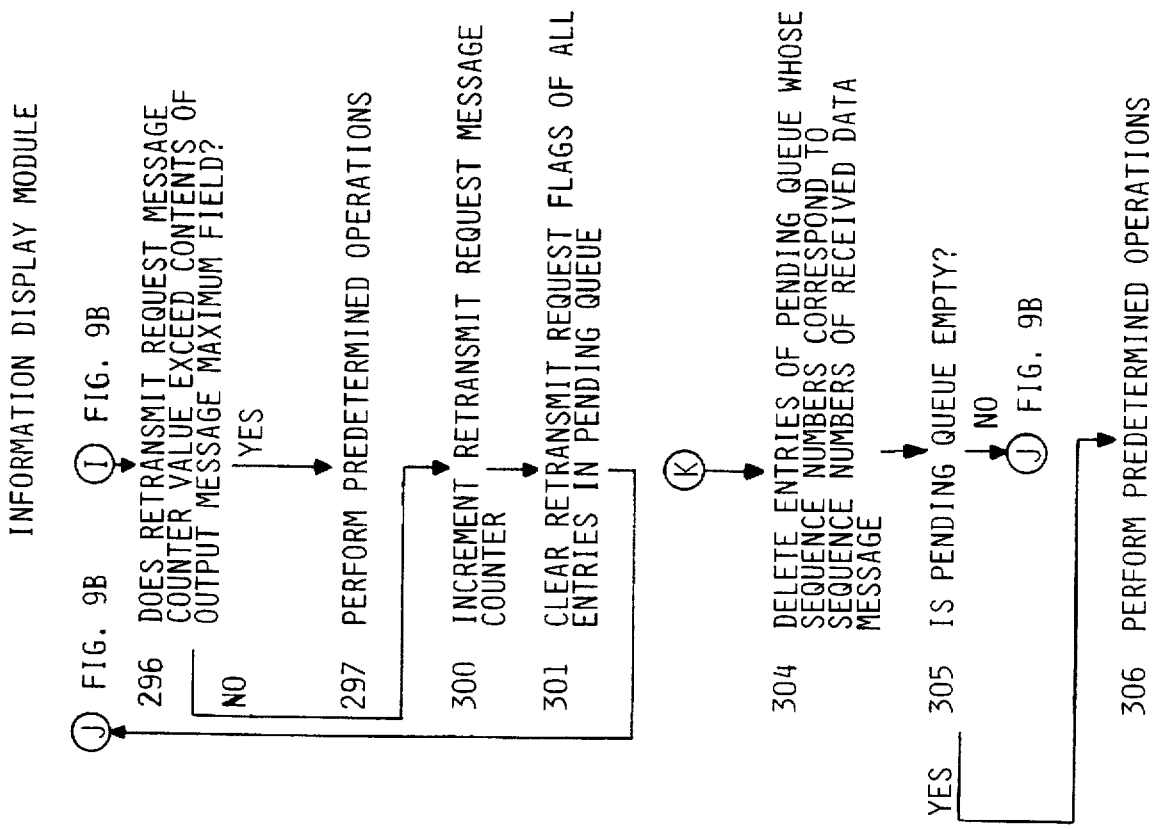

With this background, the operations of the information source module 11 and the information display module 13 over an N-way connection will be described in connection with the flow charts in FIGS. 6A through 9C. FIGS. 6A through 6C depict the operations performed in connection with a join operation, in which an information display module 13 joins an N-way connection so that it may receive update information thereover and so that it may further transmit retransmission request messages and receive retransmitted update information thereover. FIGS. 7A and 7B depict operations performed in connection with the transmission of update information over the N-way connection. FIG. 8 depicts the operations performed in connection with transmission of an alive message over the N-way connection. Finally, FIGS. 9A through 9C depict the operations performed in connection with transmission of a retransmission request message and reception of retransmitted update information over the N-way connection.

Preliminarily, it will be appreciated that, in the following discussion of FIGS. 6A through 9C, for references made to actions of the information source module 11 or actions of the information display module 13, unless otherwise indicated, the actions are initiated and controlled by the respective control modules 16 and 23, under control of the control program of information source module 11 and communications control program of information display module 13.

With reference to FIG. 6A, an information display module 13 initiates a join operation by generation of a join request message (step 200). In particular, the control portion 23 of the information display module 13 generates the join request message and transfers it to the network interface portion 20 for transmission over the communications link 12. The control portion 23 may generate the join request message on request from the operator through the operator input device 22 (step 37, FIG. 2). The join request message has the general form as shown in FIG. 5A, with a data portion 123 (FIG. 5A) as shown in FIG. 5B including the version number of the program controlling the information display module 13, a destination address value in field 124 identifying the information source module 11 and a source connection identification value in field 132 of the message.

Contemporaneously, upon receipt of a request from the operator, the information display module 13 may establish, in its information store 24, connection variables 81 for the N-way connection, whose fields are empty except for a state value of idle in the current state field 93. After transmitting the join request message, the information display module may change the state value to join pending.

The information source module 11 receives the join request message (step 201) and proceeds to process it. In particular, the network interface portion 14 of the information source module 11 receives it and transfers it to the control portion 16 of the same information source module 11 for processing. The information source module 11, in particular its control portion 16, first determines whether an N-way connection exists for the particular source connection identification contained in field 132 of the join request message (step 202). In that operation, the information source module's control portion 16 may determine whether its information store 17 includes any connection variables 51 whose current state field 54 indicates an initialized state and whose source connection identification field 72 contains a value that corresponds to the value of the source connection identification field 132 of the received join request. If not, the information source module 11 takes local action to log receipt of an erroneous joint request message, and thereafter ignores the request (step 203).

If the information source module 11 determines in step 202 that the N-way connection exists, it sequences to step 210. In that step, the information source module 11 determines whether the version number of the program controlling it is greater than or equal to the version number of the program controlling the information display module 13, which it received in the join request message. If so, the information source module 11 determines whether its program is compatible with the program controlling the information display module 13 (step 211). If not, it generates a join response message, whose data portion is depicted in FIG. 5C, indicating in field 142 (FIG. 5C) a negative join result (step 212). A negative join result indicates that the information source module 11 has determined that it is incompatible with the information display module 13 and thus that the information source module 11 cannot join the N-way connection. On the other hand, if the information source module 11 determines in step 211 that its controlling program is compatible with the program controlling the information source module 11, or if it determines that the version number of the communications control program controlling the information display module 13 is greater than the version number of the program controlling the information source module, it generates a join response message indicating in field 142 a positive join result (step 213). A positive join result thus indicates either (1) that the information display module 13 is compatible with the information source module 11, if the version number of the program controlling the information source module 11 is greater than or equal to the version number of the communications control program controlling the information display module 13, or (2) that the information display module 13 is to determine compatibility, if the version number of the program controlling the information source module 11 is less than the version number of the communications control program controlling the information display module.

Following either step 212 or 213, the information display module 13 receives the join response message (step 214) and determines whether the join result contained in field 142 is positive (step 215). If not, the information display module 13 performs predetermined operations (step 216), such as notifying the operator of the negative join result and returning the state value in the current state field 93 of the connection variables 81 to idle. On the other hand, if the information display module 13 determines in step 215 that the join result is positive, it then determines if the version of the information source is less than the version of the program controlling the information display module (step 217), to determine whether it is to make the compatibility determination. If so, it determines if its controlling program is compatible with the program controlling the information source module 11 (step 218), and, if not, it takes local action to notify the operator that the join has failed, and also to return the state value in the current state field 93 of the connection variables 81 to idle (step 226).

If the information display module 13 determines that its controlling program is compatible with the program controlling the information display module, it proceeds to update or establish data structures for the connection variables in its information store 24 (step 219) and to establish the normal group address in the network interface (step 220) so that the network interface portion can receive messages thereover. The information display module 13 then determines whether it was successful in the operations defined by steps 219 and 220 (step 221), and, if not, takes local action to notify the operator that the join request has failed. If, on the other hand, the information display module 13 determines, in step 221, that the operations in steps 219 and 220 were successful, it changes the state value in current state field 93 of connection variables 81 to identify the joined state, and proceeds to normal monitoring of messages transmitted using the normal group address, as described below (FIGS. 7A through 9C) to receive update information thereover.

As described above in connection with step 223, if the information display module 13 determines that it has successfully joined an N-way connection, that is, the current state field 93 contains a state value identifying the joined state, it may receive update information messages thereover. Operations in connection with transfer of update information messages over an N-way connection are depicted in FIGS. 7A and 7B. With reference to FIG. 7A, the information source module 11 receives an update information item from its information source and initially buffers it in its transmit data buffer 65 (FIG. 3) (step 250). It then determines whether it has already started a block timer for the data (step 251) and if not, it starts a block timer (step 252). The information source module 11 uses the block timer to aggregate update information items from the information source, if the items are being received sufficiently rapidly, while ensuring that it does not delay more than a predetermined amount of time, after receiving an update information item before transmitting it.

When the block timer times out (step 253), the information source module 11 generates a data message, including any update information items in the transmit data buffer. The data message includes a destination address field 124 which contains the normal group address, and a data portion 123 having the structure shown in FIG. 5F, including a sequence number in field 154 copied from the next sequence number field 57 of the connection variables 51 of information source module 11. The information source module 11 then transfers the transmitted update information, along with the sequence number, to its retransmit queue 60 (step 255) and increments the contents of the next sequence number field (step 257) to identify the sequence number to be used for the next data message. In addition, the information source module 11 resets the block timer and an alive message timer (step 257).

Each information display module 13 whose network interface portion 20 is monitoring the communications link 12 for messages having the normal group address contained in the data message receives the data message (step 260). Upon receipt of a data message having, in destination address field 124, the required multi-cast address for the N-way connection, the information display module 13 first determines whether the message is actually for the N-way connection. In this operation, it compares the contents of the source connection identification field 132 in message identifier portion 122 with the contents of source connection field 100 in the connection variables 81 for the N-way connection. If the information display module 13 determines that the contents of field 132 of the received message corresponds to the contents of field 100 of the connection variables 81, the message properly relates to the N-way connection associated with the multi-cast address, and so it proceeds to step 261 (below). On the other hand, if the information display module 13 determines that the contents of field 132 does not correspond to the contents of field 100, it takes local action to log the abnormality, and otherwise ignores the message.

If the information display module 13 determines that the received message properly relates to the N-way connection associated with the multi-cast address, it resets its alive time-out timer and the alive time-out counter, which it uses to determine whether the information source module 11 is operating properly (step 261). The information display module 13 then determines whether the sequence number of the received data message corresponds to the contents of its next sequence number field 105 (step 262). If so, the information display module 13 is properly receiving sequential data messages, and so it sequences to step 263 (FIG. 7B) to use the update information to update the current information displayed to the operator (step 263); in this operation, the information display module, in particular the control module 23 under control of the communications control program, makes the received update information item available for processing by the applications program. The information display module 13 then increments the contents of the next sequence number field 105 of its connection variables 81 (step 264).

Returning to step 262, if the information display module 13 determines in that step that the sequence number of the received data message does not correspond to the contents of the next sequence number field 105 of its connection variables 81, it steps to the sequence beginning on FIG. 9A to effect retransmission of any data that it missed.

FIG. 8 depicts the operations of the information source module 11 and the information display modules 13 in connection with alive messages. The information source module 11 uses the alive messages, if it has not transmitted a data message over an N-way connection for a predetermined amount of time, defined by the alive timer value in field 64 of its connection variables 51, to notify the information display modules 13 that it is still active over the N-way connection. The information source module 11 maintains an alive timer that, when it times out (step 270) enables it to generate an alive message (step 271), which has a structure shown in FIG. 5A and a data portion 123 as shown in FIG. 5E. The alive message generated by information source module 11 includes a destination address in field 124 corresponding to the normal group address of the N-way connection, and a value in field 153 corresponding to the contents of next sequence number field 57 of the connection variables 51.

Each information display module 13 receives the alive message (step 272) and in response resets any alive time-out timers and alive time-out counters that it may have started (step 273). The information display module 13 then determines whether the value in field 153 of the alive message corresponds to the value of the next sequence number field 105 of its connection variables 81 (step 274). If so, the information display module 13 has properly received all previous data messages containing update information, and so it may proceed to other processing. If, however, the information display module 13 determines, in step 274, that the values are not equal, it sequences to FIG. 9A to effect retransmission of any data that it missed.

As described above, if the information display module 13 determines, in step 262 (FIG. 7A) or step 274 (FIG. 8), that it has missed one or more data messages containing update information, it steps to the sequence starting in FIG. 9A to attempt to effectuate retransmission of the data messages. With reference to FIG. 9A, the information display module 13 initially loads the sequence number from the received message into the actual next sequence number field 106 of its connection variables 81 (step 279). In the case of a missed data message, the information display module 13 loads the value of the sequence number field 154 into the field 106, and in the case of an alive message, it loads the next sequence number value from field 153 into the actual next sequence number field 106.

The information display module 13 then determines whether the difference between the received sequence value, stored in actual next sequence number field 106, and the expected sequence value, stored in next sequence number field 105, differ by a value that is greater than the retransmit limit in field 101 (step 280). If so, the information source module 11 is unable to retransmit the individual messages containing the required update information items, and so the information display module 13 sequences to step 281 to perform predetermined operations. In this case, the information display module 13 may engage in peer-to-peer communications, similar to those described above in connection with step 37, to transfer an entire new copy of the information to the information display module 13.

If, however, the information display module 13 determines in step 280 that the difference between the received sequence value, stored in actual next sequence number field 106, and the expected sequence value, stored in next sequence number field 105, differ by a value that is less than or equal to the retransmit limit in field 101, the information source module 11 is able to supply the data messages containing the required update information. In that case, the information display module 13 establishes entries 113 in its pending queue 112 for the sequence numbers between that defined by the contents of the next sequence number field 105 and the contents of the alive next sequence number field 106, in the process clearing all of the retransmission request flags (step 282). At this point, the information display module 13 establishes, in its network interface portion 20, the remote group address for the N-way connection to enable it to receive, from the communications link 12, messages transmitted over the communications link by other modules 11 and 13 using the remote group address. The information display module 13 then selects a back-off time value, as described above, and uses it to initialize a back-off timer (step 283).

The information display module 13 then proceeds to a series of steps in which it (1) delays transmitting an retransmission request message for a time defined by the back off timer, and, during the delay time, (2) determines whether any other information display modules 13 transmit retransmission request messages for any of the data messages identified in its pending queue, and (3) only after the end of the delay time transmits a retransmission request message requesting transmission of only those data messages for which other information display modules 13 have not previously requested retransmission. More specifically, the information display module 13 first performs a step in which it determines whether the back-off timer established in step 283 has expired (step 284). If not, it determines whether it has received a retransmission request message which identifies a sequence number in any of its pending queue entries (step 285). If not, it returns to step 284. If, however, the information display module 13 determines that it has received such a message, it sets the retransmission requested flags of the entries in the pending queue whose sequence numbers are identified in the retransmission requested message (step 286) before returning to step 284.

The information display module 13 repeats steps 284 and 285 until its backoff timer has timed out and the delay period has ended. At that point, the information display module will have set the retransmission requested flags 114 of all entries 113 in the pending queue 112 for which other information display modules 13 in system 10 have transmitted, during the delay period, retransmission request messages. The information display module 13 sequences to step 290 to initialize a retransmission request message counter, and thereafter generates a retransmission request message having the structure shown in FIGS. 5A and 5G (step 291). The retransmission request message includes a destination address in field 124 corresponding to the retransmit group address from field 95 of its connection variables 81, and a source physical address in field 160 corresponding to the contents of field 97 of its connection variables. The information display module 13 identifies, in fields 161, sequence numbers from only the entries in its pending queue 112 whose retransmission requested flags are clear, that is, sequence numbers whose retransmission has not already been requested by other information display modules 13 in the system 10.

The information display module 13 then increments the contents of its lost current field 111 of its connection variables 81 (step 292), and may determine whether it is a "nagging" receiver at that point. In that operation, the information display module 13 determines whether the contents of the lost current field 111 are greater than the value in field 91 of its management variables 80. If the information display module 13 determines that it is a "nagging" receiver, it may take predetermined actions, such as terminating its use of the N-way connection.

Following step 292, the information display module 13 starts an output message timer, to establish a time-out period for a response from the information source module 11 (step 293). If the information source module 11 does not respond within the time-out period (steps 294 and 295), the information display module 13 determines whether the value of the retransmission request message counter exceeds a predetermined maximum value, and, if not, increments the counter (step 300), clears the retransmission requested flags of all of the entries in the pending queue (step 301) and returns to step 291 to effect a transmission of another retransmission request message, this time for all of the sequence numbers identified in the pending queue. If the information source module 11 does not respond to a predetermined number of retransmission request messages, the request information display module 13 will at some point sequence from step 296 to step 297 to perform predetermined operations, such as notification of the operator of a malfunction of the information source module 11.

If the information source module 11 is operating properly, it will receive the retransmission request message (step 302). The information source module 11 then determines whether the received retransmission request message is one for an N-way connection which it is supporting. In this operation, the information source module 11 compares the source connection identification value in field 132 of the received message corresponds to the value in field 72 of a set of connection variables 51. If not, the retransmission request message is not for an N-way connection which it is supporting, and so the information source module 11 ignores the message. On the other hand, if the information source module 11 determines that the values do correspond, the received message is for an N-way connection supported thereby, and so it generates data messages with the requested data, using the retransmit group address in the destination address field 124 (step 303). In that case, the information display module 13 sequences from step 294 to step 304, in which it stores the update information items in the message in the corresponding entry 113 in the pending queue 112, that is, the entry 113 whose sequence numbers correspond to sequence numbers of the received data message (step 304).

The information display module 13 then determines whether it can deliver update information items from any entries 113 in the pending queue for display to, or other use by, the operator. In that determination, the information display module 13 determines whether a sequence of one or more entries 113, from the beginning of the pending queue 112 contain retransmitted update information items, and, if so, delivers the update information items from that sequence for processing by the applications program; and purges those entries 113 from the queue 112. If the pending queue is not, at that point, empty (step 305), the information display module 13 may return to step 291 to continue generating retransmission requested messages, as necessary. If, however, the information display module 13 determines in step 305 that the pending queue is empty, it may sequence to step 306, to perform other operations.

As the information display module 13 receives data messages containing retransmitted update information items, it stores the data messages in fields 116 in the entries 113 in the pending queue 112 whose sequence numbers, in fields 114, correspond to sequence numbers in the received data messages, ignoring any data messages that it has already stored in its pending queue 112. The control module 23, under control of the communications control program, determines whether the first entry 113(1) in the pending queue contains a data message in field 116 of the entry, and, if so, it delivers the data to the applications program for its use, and then purges the entry. The control module 23 performs the same operations on each succeeding entry 113, until it reaches an entry 113 whose field 116 does not contain a data message. Thus, the control module 23 delivers the data messages in the pending queue 112 in the sequence order in which they were originally transmitted by the information source module 11.

At some point, if the data messages containing retransmitted update information items are all received by the information display module 13, the data for all entries 113 in the pending queue will be delivered to the applications program, the respective entries purged and thus pending queue 112 will become empty. When the pending queue is empty, the information display module 13 disables the retransmission group address in its network interface portion 20 thus returning to reception only of messages whose destination address in field 124 contains the normal group address. Thereafter, the information display module 13 does not receive any messages whose destination address contain the retransmit group address, until it may require another retransmission itself, thereby reducing processing requirements of the module 13.

The invention provides a number of advantages. First, the invention provides a flexible arrangement for delivering information from an information source to an information user, such as the information display module. In particular, the arrangement facilitates transmission of original information using a peer-to-peer protocol, following by update information items using a multi-cast protocol. Since the rate of transmission of update information items is expected to be much higher than rate of transmission of original information, and since update information items may be required by a number of information users concurrently, while the timing of the original information transmissions may be random or unpredictable, the arrangement provides an efficient mechanism for maintaining information at the information users in an updated condition while minimizing the processing by both the information source modules and information display modules.

The invention also provides an efficient mechanism for transmitting update information items, in sequence, from the information source modules to the information display modules. In particular, each information display module determines whether it has missed a message containing update information, and thereafter requests retransmission of the missed update information item. Since the retransmission requests and retransmitted data are transferred over a different channel, defined by a retransmit group address, from the channel used to normally transmit messages containing update information items, the information display modules do not have to monitor the retransmit group address channel unless they require retransmission, thereby reducing processing load on the information display modules. In addition, since the information display modules have diverse back-off times, after determining that they require retransmission of update information items, before they transmit retransmission request messages, and since they (at least initially) only request retransmission of update information items for which others have not already requested retransmission, the volume of retransmission requests received by the information source module 11, and thus the amount of processing thereby, is accordingly minimized. Accordingly, the protocol permits a graceful scaling as information display modules 13 are added to the system 10, without requiring a corresponding amount of processing power by the information source modules 11 to process requests for retransmission which they may receive therefrom.

It will be appreciated that the information source modules 11 and information display modules 13 may be implemented in special purpose hardware or in suitably programmed digital computer arrangements, or a combination thereof, which perform the operations depicted in the flow diagrams of FIGS. 2 and 6A through 9C.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A computer system having an information source for transmitting information items to a plurality of information displays over a communications link,
   A. said information source including a first interface, coupled to the communications link, for transmitting said information items and receiving original information item requests on said communications link, and an information source controller, coupled to the interface, such information source controller comprising:
      i. an original information transmission means for responding to said original information item requests received from said information displays by said first interface by, for each one of said requests and for generating a requested original information item, designating said original information item for use by the information display that made said request;
      ii. means for causing said first interface to transmit said original information item over said communications link;
      iii. an update information transmission means, coupled to the information source controller, for generating update information items and designating said update information items for use by multiple information displays, each one of said update information items containing update information relating to an original information item that was previously transmitted by said first interface and being identified by said update information transmission means as an update thereof;
      iv. means for causing said first interface to transmit said update information items over said communications link;
   B. each one of said information displays including a second interface, coupled to the communications link, for transmitting said original information item requests and receiving said information items on said communications link, an information display controller coupled to the second interface, and a display device, coupled to the information display controller, for displaying said information items, said information display controller comprising:
      i. an original information means, coupled to the information display controller, for generating said original information item request;
      ii. means for causing said second interface to transmit said original information item request over said communications link
      iii. means for processing and displaying at said display device only those original information items received from said communications link by said second interface that have been designated by said original information transmission means for use by said one information display
      iv. means for discarding other original information items received from said communications link by said second interface;
      v. an update information reception means for processing and displaying at said display device an update information item received from said communications link by said second interface only if said update information item has been identified by said update information transmission means as an update of an original information item that said original information means has previously processed and displayed at said display device, and
      vi. means for discarding other update information items received from said communications link by said second interface.

2. A system as defined in claim 1 in which said information source further includes an information source advertising message transmitting means for periodically generating information source advertising messages and causing said first interface to transmit said information source advertising messages over said communications link to identify types of information available from said information source, each one of said information displays including an information source advertising message means for using information source advertising messages received from said communications link by said second interface to associate the information source with an information type.

3. A system as defined in claim 2 in which said information source advertising message means establishes an information source directory in which it stores an association between the information source and an information type, said original information means using the contents of the information source directory in identifying an information source associated with an information type and using the identification in generating an original information item request.

4. A system as defined in claim 3 in which said information display includes an input means to facilitate input of control information by an operator, one type of control information including information type selection information, said original information transmitting means using said information type selection in formation in connection with using said information source directory to identify an information source.

5. A system as defined in claim 1 in which said update information transmission means causes said first interface to transmit said update information items over said communications link in sequenced update messages, wherein:
   A. said update information reception means includes:
      i. a primary update reception means for receiving update messages, each including an update information item, from said second interface;
      ii. an update processing means for determining whether the messages received by said update reception means are in sequence; and
      iii. a retransmission request transmission means for generating a retransmission request message and causing said second interface to transmit said retransmission request message over said communications link if said update processing means determines that said update messages are not in sequence; and
   B. said update information transmission means includes:
      i. an update transmission means for causing said first interface to transmit update messages over said communications link;
      ii. an update retransmission means for causing said first interface to retransmit update messages, each including an update information item, over said communications link; and
      iii. a retransmission request reception means for receiving retransmission request messages from said first interface and for enabling said update retransmission means in response thereto.

6. A system as defined in claim 5 in which messages are transmitted over said communications link in channels, said first interface transmitting and said second interface receiving update messages over a primary channel, and said second interface transmitting retransmission request messages and said first interface retransmitting update messages over a retransmit update channel.

7. A system as defined in claim 6 in which each channel is identified by an address.

8. A system as defined in claim 6 in which said update information reception means further includes a retransmission reception means enabled in response to transmission of a retransmission request message by said second interface, said retransmission reception means receiving retransmitted update messages received by said second interface over said retransmit update channel.

9. A system as defined in claim 5 wherein said retransmission request transmission means includes:
   A. a message sequence establishing portion for identifying, in response to a determination by said update processing means that said update messages are not in sequence, update messages that were not received by said primary update reception means;
   B. a backoff timer for generating a timing indication at the end of a backoff timing interval after a determination by said update processing means that said update messages are not in sequence;
   C. a retransmission message receiving portion for receiving retransmission request messages from said second interface for identifying update messages whose retransmission is requested thereby; and
   D. a retransmission request message generating portion for generating a retransmission request message in response to generation of said timing indication, said retransmission request message requesting retransmission of those update messages identified by said message sequence establishing portion and not identified in retransmission request messages received by said retransmission message receiving portion.

10. A computer system as defined in claim 9, wherein said message sequence establishing portion establishes a queue including a plurality of entries, each entry including a portion for receiving an update message identification and a retransmission requested flag, said retransmission message receiving portion setting the retransmission requested flag in an entry in response to receipt of a retransmission requested message identifying the update message identified in the entry's update message identification portion, and the retransmission request message generating portion generating a retransmission request message for those update messages identified in entries of said queue whose retransmission requested flags are not set.

11. A system as defined in claim 5 in which said retransmission request transmission means maintains a count of the number of retransmission request messages it transmits in a predetermined period of time, said retransmission request transmission means terminating operating if said count exceeds a predetermined value.

12. In a computer system comprising an information source means and a plurality of information displays interconnected by a communications link, an arrangement for transferring information items from said information source to said information displays by transmitting messages to multiple ones of said information displays over said communications link, each one of said messages including an information item,
   A. each one of said information displays including a first interface for transmitting and receiving messages on said communications link, a an information display controller, and a display device for displaying information items, said information display controller having an information reception means that includes:
      i. a primary reception means for receiving messages received by said first interface from a primary channel of said communications link for processing and display at said display device by said information display;
      ii. a processing means for determining whether said messages received by said primary reception means have been correctly received;
      iii. a retransmission request means for generating a retransmission request message and causing said first interface to transmit said retransmission request message over said communications link if said processing means determines that one of said received message has not been correctly received; and iv. a retransmission reception means for receiving retransmissions of said messages received by said first interface over a separate retransmit channel of said communications link and processing said received retransmissions for display at said display device;

B. said information source means including a second interface for transmitting and retransmitting said messages, and for receiving retransmission request messages, over said communications link and an information source controller, said information source controller including an information transmission means comprising;

i. a primary transmission means for causing said second interface to transmit said messages over said primary channel of said communications link, said primary transmission means designating each one of said messages for processing and display by multiple ones of said information displays;

ii. a retransmission means for responding to a said retransmission request message from one of said information displays by causing said second interface to retransmit a message including an information item over said separate retransmit channel of said communications link, said retransmission means designating said retransmitted message for processing and display by multiple ones of said information displays; and iii. a retransmit request receiving means for receiving retransmission request messages received by said second interface from said communications link and for enabling said retransmission means in response thereto;

C. said processing means of each one of said information displays enabling said retransmission reception means thereof to process and display at said display said retransmitted messages only when said processing means determines that said messages received by said primary reception means have not been correctly received.

13. A system as defined in claim 12 in which said retransmit request means causes said first interface to transmit said retransmission request messages over said separate transmit channel.

14. A system as defined in claim 12 in which each channel is identified by an address.

15. A system as defined in claim 12 in which said retransmission reception means is enabled in response to transmission of said first interface, said retransmission request transmission means.

16. A system as defined in claim 12 wherein said retransmission request means includes:

A. a message sequence establishing portion for identifying, in response to a determination by said processing means that said messages are not in sequence, messages that were not received by said primary reception means;

B. a backoff timer for generating a timing indication at the end of a backoff timing interval after a determination by said processing means that said messages are not in sequence;

C. a retransmission request message receiving portion for receiving retransmission request messages received by said first interface from said communications link and for identifying messages whose retransmission is requested thereby; and D. a retransmission request message generating portion for generating a retransmission request message in response to generation of said timing indication, said generated retransmission request message requesting retransmission of those messages identified by said message sequence establishing portion and not identified in received retransmission request messages by said retransmission request message receiving portion.

17. A system as defined in claim 16, wherein said message sequence establishing portion establishes a queue including a plurality of entries, each entry including a portion for receiving a message identification and a retransmission requested flag, said retransmission request message receiving portion setting the retransmission requested flag in an entry in response to receipt of a retransmission request message identifying the message identified in the entry's message identification portion, and the retransmission request message generating portion generating a retransmission request message for those messages identified in entries of said queue whose retransmission requested flags are not set.

18. A system as defined in claim 12 in which said retransmission request means maintains a count of the number of retransmission request messages transmitted by the first interface in a predetermined period of time, said retransmission request means terminating operation if said count exceeds a predetermined value.

19. An information source means for use in a computer system of the kind in which said information source transmits information items to a plurality of information displays over a communications link, said information source including an interface for transmitting said information items and receiving original information item requests on said communications link and a controller, said controller comprising:

A. an original information transmission means for responding to an original information item request received from one of said information displays by said interface by generating the original information item requested by said one information display, designating said original information item for use by said one information display so that only said one information display will process and display said original information item, and causing said interface to transmit said original information item over said communications link;

B. an update information transmission means for generating update information items, designating said update information items for use by multiple information displays, and causing said interface to transmit said update information items over said communications link, each one of said update information items containing update information relating to original information item that was previously transmitted by said interface and being identified by said update information transmission means as an update thereof so that said update information item will be processed and displayed only by information displays that previously processed and displayed an original information item to which said update relates.

20. An information source as defined in claim 19 in which said update information transmission means causes said interface to transmit update information items in sequenced update messages, said update information transmission means further comprising;

A. an update transmission means for causing said interface to transmit update messages over said communications link;

B. an update retransmission means for causing said interface to transmit retransmit update messages, each including an update information item, over said communications link; and C. a retransmit request receiving means for receiving retransmission request messages received by said interface from said communications link and for enabling said update retransmission means in response thereto.

21. An information source as defined in claim 20 in which said interface transmits messages over said communications link in channels, said interface transmitting update messages over a primary channel, and said interface transmitting retransmit update messages over a retransmit update channel.

22. An information source means as defined in claim 21 in which each channel is identified by an address.

23. An information source for use in a computer system of the kind in which said information source transmits messages to a plurality of information display displays over a communications link, said information source including an interface for transmitting said messages over said communications link and a controller including an information transmission means comprising:

A. a primary transmission means for causing said interface to transmit a message over a primary channel of said communications link, said primary transmission means designating said message for processing and display by multiple ones of said information displays;

B. a retransmission means for causing said interface to retransmit a message including an update information item over a separate retransmit channel of said communications link, said retransmission means designating said retransmitted message for processing and display by multiple ones of said information displays; and C. a retransmit request receiving means for receiving retransmission request messages received by said interface from said communications link and for enabling said retransmission means in response thereto.

24. An information source means as defined in claim 23 in which said retransmit request receiving means receives said retransmission request messages over said separate retransmit channel.

25. An information source module as defined in claim 24 in which each channel is identified by an address.

26. An information display for use in a computer system of the kind in which an information source transmits information items to a plurality of information displays over a communications link, said information displays including an interface for transmitting original information item requests and receiving said information items on said communications link, a controller, and a display device for displaying said information items, said controller comprising:

A. an original information means for generating an original information item request, causing said interface to transmit said original information item request to said information source over said communications link, processing and displaying at said display device only those original information items received by said interface from said communications link that have been designated by said information source for use by said information display, and discarding other original information items received by said interface from said communications link; and B. an update information reception means for processing and displaying at said display device an update information item received by said interface from said communications link only if said update information item has been identified by said information source as an update of an original information item that said original information means has previously processed and displayed at said display device, and discarding other update information items received by said interface from said communications link.

27. An information display as defined in claim 26 in further including an information source advertising message means for using information source advertising messages received by said interface over said communications link to associate the information source with an information type.

28. An information display as defined in claim 27 in which said information source advertising message establishes an information source directory in which it stores an association between the information source and an information type, said original information source means using the contents of the information source directory in identifying an information source associated with an information type and using the identification in generating an original information item request.

29. An information display as defined in claim 28 further including an input means to facilitate input of control information by an operator, one type of control information including information type selection information, said original information means using said information type selection information in connection with using said information source directory to identify an information source.

30. An information display as defined in claim 26 in which said information source transmits update information items in sequenced update messages, said update information reception means including:

A. an update reception means for receiving update messages, each including an update information item, received by said interface from said communications link;

B. an update processing means for determining whether the messages received by said update reception means are in sequence; and C. a retransmission request transmission means for causing said interface to transmit a retransmission request message over said communications link in response to a determination by said update processing means that said update messages are not in sequence.

31. an information display module as defined in claim 30 in which messages are transmitted over said communication links in channels, said interface receiving update messages over a primary channel and transmitting retransmission request messages over a retransmit update channel.

32. An information display as defined in claim 31 in which each channel is identified by an address.

33. An information display as defined in claim 31 in which said update reception means further includes a retransmission reception means enabled in response to transmission of a retransmission request message by said interface, said retransmission reception means receiving retransmitted update messages received by said interface over said retransmit update channel.

34. An information display as defined in claim 30 wherein said retransmission request transmission means includes:

A. a message sequence establishing portion for identifying, in response to a determination by said update processing means that said update messages are not in sequence, update messages that were not received by said update reception means;

B. a backoff timer for generating a timing indication at the end of a backoff timing interval after a determination by said update processing means that said update messages are not in sequence;

C. a retransmission request message receiving portion for receiving retransmission request messages received by said interface from said communications link and identifying update messages whose retransmission is requested thereby; and D. a retransmission request message generating portion for generating a retransmission request message in response to generation of said timing indication and causing said interface to transmit said retransmission request message over said communications link, said retransmission request message requesting retransmission of those update messages identified by said message sequence establishing portion and not identified in retransmission request messages received by said retransmission request message receiving portion.

35. An information display as defined in claim 34, wherein said message sequence establishing portion establishes a queue including a plurality of entries, each entry including a portion for receiving an update message identification and a retransmission requested flag, said retransmission request message receiving portion setting the retransmission requested flag in an entry in response to receipt of a retransmission request message identifying the update message identified in the entry's update message identification portion, and the retransmission request message generating portion generating a retransmission request message for those update messages identified in entries of said queue whose retransmission requested flags are not set.

36. An information display as defined in claim 30 in which said retransmission request transmission means maintains a count of the number of retransmission request messages it transmits in a predetermined period of time, said retransmission request transmission means terminating operation if said count exceeds a predetermined value.

37. An information display for use in a computer system comprising an information source and a plurality of information displays interconnected by a communications link, said computer system including an arrangement for transferring information items from said information source to said information displays by transmitting messages, each including an information item, to said information displays over said communications link, said information display including an interface for receiving said messages over said communications link and a controller, said controller including an information reception means that includes:

A. a primary reception means for receiving said messages received by said interface from a primary channel of said communications link;

B. a processing means for determining whether said messages received by said primary reception means have been correctly received;

C. a retransmission request means for causing said interface to transmit a retransmission request message over said communications link if said processing means determines that said messages have not been correctly received; and D. a retransmission reception means for processing retransmissions of said messages received by said interface over a separate retransmit channel of said communications link;

E. said processing means enabling said retransmission reception means to process said retransmissions of said messages only when said processing means determines that said messages received by said primary reception means have not been correctly received.

38. An information display as defined in claim 37 in which said retransmission request means causes said interface to transmit said retransmission request message over said separate retransmit channel.

39. An information display as defined in claim 38 in which each channel is identified by an address.

40. An information display as defined in claim 37 in which said interface is enabled in response to transmission of said retransmission request message by said retransmission request means.

41. An information display as defined in claim 37 wherein said retransmission request means includes:

A. a message sequence establishing portion for identifying, in response to a determination by said processing means that said messages are not in sequence, messages that were not received by said primary reception means;

B. a backoff timer for generating a timing indication at the end of a backoff timing interval after a determination by said processing means that said messages are not in sequence;

C. a retransmission message receiving portion for receiving retransmission request messages received by said interface from said communications link and for identifying messages whose retransmission is requested thereby; and D. a retransmission request message generating portion for generating a retransmission request message in response to generation of said timing indication and causing said interface to transmit said retransmission request message over said communications link, said retransmission request message requesting retransmission of those messages identified by said message sequence establishing portion and not identified in received retransmission request messages by said retransmission message receiving portion.

42. An information display as defined in claim 41, wherein said message sequence establishing portion establishes a queue including a plurality of entries, each entry including a portion for receiving a message identification and a retransmission requested flag, said retransmission message receiving portion setting the retransmission requested flag in an entry in response to receipt of a retransmission requested message identifying the message identified in the entry's message identification portion, said retransmission request message generating portion generating a retransmission request message for those update messages identified in entries of said queue whose retransmission requested flags are not set; and said information reception means further including a retransmit information receiving means for receiving retransmit messages received by said interface over a retransmit channel of said communications link.

43. An information display as defined in claim 37 in which said retransmission request means maintains a count of the number of retransmission request messages transmitted by the interface in a predetermined period of time, said retransmission request means terminating operation if said count exceeds a predetermined value.

44. The system of claim 12 in which said information source causes said second interface to broadcast said messages as a series of sequenced messages and said processing means determines whether said messages have been correctly received by said primary reception means by determining whether said messages received by said primary reception means are in sequence.

45. A computer system of the kind in which an information source transmits messages to a plurality of information displays over a communications link,
   A. said information source including a first interface for transmitting said messages over said communications link and a controller, said controller comprising:
      i. a primary message means for causing said first interface to transmit messages over a primary channel of said communications link, said primary message means designating said messages for processing and display by multiple ones of said information displays;
      ii. a retransmission request means for receiving a retransmission request received by said first interface over said communications link from one of said information displays;
      iii. a retransmission means for causing said first interface to retransmit messages over a separate retransmit channel of said communications link to multiple ones of said information displays in response to reception of said retransmission request from one of said information displays by said first interface, said retransmission means designating said retransmitted messages for processing and display by multiple ones of said information displays;
   B. each one of said information displays including a second interface for transmitting said retransmission requests and receiving said messages over said communications link, a controller, and a display device for displaying said messages, said controller comprising:
      i. a message receiving means for receiving said messages received by said second interface over said primary channel of said communications link for processing and display at said display device;
      ii. a message processing means for determining if said messages received by said message receiving means have been correctly received and, upon a determination of incorrect receipt of one of said messages, indicating that a retransmission request is necessary;
      iii. a retransmission request transmission means for causing said second interface to transmit said retransmission request in response to said indication by said message processing means; and
      iv. a retransmission message receiving means for causing said second interface to monitor said separate retransmit channel of said communications link and receive said retransmitted messages over said separate retransmit channel, said retransmission message receiving means processing said received retransmitted messages for display at said display device;
   C. said message processing means of each one of said information displays enabling said retransmission message receiving means thereof to process said retransmitted messages for display at said display device only when said message processing means determines that said messages received by said message receiving means have not been correctly received.

46. The system of claim 45 in which said second interface transmits said retransmission request over said separate retransmit channel of said communications link.

47. The system of claim 45 in which said retransmission message receiving means causes said second interface to monitor said separate retransmit channel only after said transmission of said retransmission request by said second interface and until receipt of said retransmitted message.

48. The system of claim 45 in which said retransmission message receiving means causes said second interface to monitor said separate retransmit channel only after said indication by said message processing means and until receipt of said retransmitted message.

49. A computer system of the kind in which an information source transmits messages to a plurality of information displays over a communications link,
   A. said information source including a first interface for transmitting said messages over said communications link and a controller, said controller comprising:
      i. an original message transmitting means for causing said first interface to broadcast original messages over said communications link to multiple ones of said information displays;
      ii. a retransmission request reception means for receiving retransmission requests received by said first interface over said communications link from said information displays;
      iii. a retransmission message broadcasting means for causing said first interface to broadcast retransmission messages over said communications link to multiple ones of said information displays in response to reception of said retransmission request from one of said information displays by said retransmission request reception means;
   B. each one of said information displays including a second interface for transmitting said retransmission requests and receiving said messages over said communications link and a controller comprising:
      i. an original message receiving means for receiving said original messages received by said second interface over said communications link;
      ii. an original message processing means for determining if said original messages are correctly received and, upon a determination of incorrect receipt of one of said original messages, indicating that a retransmission request should be made;
      iii. a retransmission request means comprising:
         a. a timer means for waiting a predetermined time after said indication by said original message processing means;
         b. a monitoring means for causing said second interface to monitor said communications link during said predetermined time and generating a signal upon detection by said second interface of a message regarding retransmission of said one message; and
         c. a retransmission request transmission means for causing said second interface to transmit said retransmission request upon expiration of said predetermined time unless said monitoring means has generated said signal; and
      iv. a retransmission message receiving means for causing said second interface to monitor said communications link and receive said retransmission messages over said communications link.

50. The system of claim 49 in which said monitoring means generates said signal if said second interface detects a retransmission of said one message.

51. The system of claim 49 in which said monitoring means generates said signal if said second interface detects a retransmission request for said one message by another information display.

52. A computer system of the kind in which an information source transmits messages to a plurality of information displays over a communications link, A. said information source including a first interface for transmitting said messages over said communications link and a controller, said controller comprising:
  i. an original message transmitting means for causing said first interface to transmit a sequence of original messages over said communications link to multiple ones of said information displays, each of said original messages containing a sequence number;
  ii. a retransmission request reception means for receiving retransmission requests received by said first interface over said communications link from said information displays; and
  iii. a retransmission message transmitting means for causing said first interface to broadcast retransmission messages over said communications link to multiple ones of said information displays in response to reception of said retransmission request from one of said information displays by said retransmission request reception means;
B. each one of said information displays including a second interface for transmitting said retransmission requests and receiving said messages over said communications link and a controller comprising:
  i. an original message receiving means for receiving said sequence of original messages received by said second interface over said communications link;
  ii. an original message processing means for determining if any of said sequence of original messages are missing by comparing the sequence number of a currently received original message with the sequence number of a previously received original message and, upon a determination that a said original message is missing, indicating that a retransmission request should be made for said missing original message;
  iii. a retransmission request transmission means for causing said second interface to transmit said retransmission request for said missing original message in response to said original message processing means;
  iv. a retransmission request inhibiting means for inhibiting said retransmission request for said missing original message if said sequence numbers of said currently received original message and said previously received original message differ by more than a predetermined amount; and
  v. a retransmission message receiving means for causing said second interface to monitor said communications link and receive said retransmission messages over said communications link.

53. A computer system of the kind in which an information source transmits messages to a plurality of information displays over a communications link,
A. said information source including a first interface for transmitting said messages over said communications link and a controller, said controller comprising:
  i. an original message transmitting means for causing said first interface to transmit original messages over said over said communications link to multiple ones of said information displays;
  ii. a retransmission request reception means for receiving retransmission requests received by said first interface over said communications link from said information displays;
  iii. a retransmission message transmitting means for causing said first interface to transmit retransmission messages over said communications link to multiple ones of said information displays in response to reception of said retransmission request from one of said information displays by said retransmission request reception means;
B. each one of said information displays including a second interface for transmitting said retransmission requests and receiving said messages over said communications link and a control means comprising:
  i. an original message receiving means for receiving said original messages received by said second interface over said communications link;
  ii. an original message processing means for determining if said original messages are correctly received and, upon a determination of incorrect receipt of one of said original messages, indicating that a retransmission request should be made for said one original message;
  iii. a retransmission request transmission means for causing said second interface to transmit said retransmission request for said one original message in response to said indication by said original message processing means;
  iv. a retransmission request inhibiting means for maintaining a count of the number of retransmission requests that have been made in a predetermined time period and inhibiting said retransmission request for said one original message if said count exceeds a predetermined value; and
  v. a retransmission message receiving means for causing said second interface to monitor said communications link and said retransmission messages over said communications link.

* * * * *